(12) United States Patent
Fischmann

(10) Patent No.: US 9,920,498 B2
(45) Date of Patent: Mar. 20, 2018

(54) FLOATING LAKE SYSTEM AND METHODS OF TREATING WATER WITHIN A FLOATING LAKE

(71) Applicant: Crystal Lagoons (Curacao) B.V, Curacao (NL)

(72) Inventor: Fernando Benjamin Fischmann, Santiago (CL)

(73) Assignee: Crystal Lagoons (Curacao) B.V., Curacao (NL)

( * ) Notice: Subject to any disclaimer, the term of this patent is extended or adjusted under 35 U.S.C. 154(b) by 314 days.

(21) Appl. No.: 14/531,395

(22) Filed: Nov. 3, 2014

(65) Prior Publication Data

US 2015/0125212 A1     May 7, 2015

Related U.S. Application Data

(60) Provisional application No. 61/900,308, filed on Nov. 5, 2013.

(51) Int. Cl.
*B01D 21/00* (2006.01)
*B01D 21/01* (2006.01)
(Continued)

(52) U.S. Cl.
CPC .......... *E02B 15/04* (2013.01); *B01D 21/0012* (2013.01); *B01D 21/01* (2013.01); *C02F 1/001* (2013.01); *C02F 1/52* (2013.01); *C02F 9/00* (2013.01); *E02B 15/041* (2013.01); *E02B 15/045* (2013.01); *E02B 15/06* (2013.01);
(Continued)

(58) Field of Classification Search
CPC .......... C02F 1/004; C02F 1/442; C02F 1/444; C02F 1/52; C02F 1/72; C02F 1/722; C02F 1/76; C02F 1/78; C02F 2103/007; C02F 2209/04; C02F 2209/44; C02F 2209/11;
(Continued)

(56) References Cited

U.S. PATENT DOCUMENTS

| | | |
|---|---|---|
| 2,071,520 A | 2/1937 | Harrison |
| 2,141,811 A | 12/1938 | Everson |

(Continued)

FOREIGN PATENT DOCUMENTS

| | | |
|---|---|---|
| CN | 1256250 | 6/2000 |
| CN | 102092824 | 6/2011 |

(Continued)

OTHER PUBLICATIONS

African Regional Intellectual Property Organization (ARIPO) report for corresponding application No. AP/P/2007/004242 dated Dec. 7, 2010.

(Continued)

*Primary Examiner* — Pranav N Patel
(74) *Attorney, Agent, or Firm* — Merchant & Gould P.C.

(57) ABSTRACT

The present invention relates to floating lakes and to the treatment of the water in such lakes. The present invention further relates to large floating lakes that can be installed within a natural or artificial water body to improve water conditions that are unsuitable for recreational uses. The floating lake can be provided with a chemical application system; a filtration system including a mobile suctioning device and filters; a skimmer system, and optionally a coordination system.

15 Claims, 10 Drawing Sheets

(51) Int. Cl.

| | | |
|---|---|---|
| C02F 1/00 | (2006.01) | |
| C02F 1/52 | (2006.01) | |
| C02F 9/00 | (2006.01) | |
| E04H 4/00 | (2006.01) | |
| E04H 4/12 | (2006.01) | |
| E02B 15/04 | (2006.01) | |
| E02B 15/06 | (2006.01) | |
| E02B 15/08 | (2006.01) | |
| C02F 1/72 | (2006.01) | |
| C02F 1/78 | (2006.01) | |
| C02F 1/76 | (2006.01) | |
| C02F 1/56 | (2006.01) | |
| C02F 1/44 | (2006.01) | |
| C02F 103/00 | (2006.01) | |
| C02F 103/02 | (2006.01) | |
| C02F 103/42 | (2006.01) | |
| C02F 1/467 | (2006.01) | |

(52) U.S. Cl.
CPC ...... *E02B 15/0807* (2013.01); *E02B 15/0814* (2013.01); *E04H 4/0012* (2013.01); *E04H 4/1209* (2013.01); *C02F 1/004* (2013.01); *C02F 1/008* (2013.01); *C02F 1/442* (2013.01); *C02F 1/444* (2013.01); *C02F 1/4672* (2013.01); *C02F 1/5245* (2013.01); *C02F 1/56* (2013.01); *C02F 1/72* (2013.01); *C02F 1/722* (2013.01); *C02F 1/76* (2013.01); *C02F 1/78* (2013.01); *C02F 2001/007* (2013.01); *C02F 2103/007* (2013.01); *C02F 2103/023* (2013.01); *C02F 2103/42* (2013.01); *C02F 2201/006* (2013.01); *C02F 2209/001* (2013.01); *C02F 2209/005* (2013.01); *C02F 2209/03* (2013.01); *C02F 2209/04* (2013.01); *C02F 2209/06* (2013.01); *C02F 2209/07* (2013.01); *C02F 2209/11* (2013.01); *C02F 2209/36* (2013.01); *C02F 2209/44* (2013.01); *C02F 2303/10* (2013.01); *Y02W 10/30* (2015.05)

(58) Field of Classification Search
CPC ......... C02F 2201/002; C02F 2201/008; B01D 21/01; B01D 21/0027
See application file for complete search history.

(56) References Cited

U.S. PATENT DOCUMENTS

| | | | |
|---|---|---|---|
| 2,276,943 A | 3/1942 | Dow | |
| 2,314,767 A | 3/1943 | Burrell | |
| 2,646,889 A | 7/1953 | August | |
| 2,923,954 A | 2/1960 | Babcock | |
| 3,132,773 A | 5/1964 | Hampton | |
| 3,247,053 A | 4/1966 | Hodge | |
| 3,266,631 A | 8/1966 | Snaper | |
| 3,317,925 A | 5/1967 | Vance | |
| 3,321,787 A | 5/1967 | Myers | |
| 3,361,150 A | 1/1968 | Horner | |
| 3,406,416 A | 10/1968 | Presby et al. | |
| 3,412,862 A | 11/1968 | Chaplin | |
| 3,419,916 A | 1/1969 | Schankler | |
| 3,470,091 A | 9/1969 | Budd et al. | |
| 3,517,513 A * | 6/1970 | Trippe .................. | B65D 88/78 405/52 |
| 3,540,274 A | 11/1970 | Shore | |
| 3,616,923 A * | 11/1971 | Haley .................. | E04H 4/1263 210/242.3 |
| 3,641,594 A | 2/1972 | Hough | |
| 3,660,957 A | 5/1972 | Schankler | |
| 3,695,434 A | 10/1972 | Whitten, Jr. | |
| 3,748,810 A | 7/1973 | Mattingly | |
| 3,788,982 A | 1/1974 | Zsoldoes, Jr. et al. | |
| 3,844,760 A | 10/1974 | Nelson | |
| 3,887,666 A | 6/1975 | Heller et al. | |
| 3,949,442 A | 4/1976 | Chandler | |
| 3,950,809 A | 4/1976 | Schatzmann | |
| 4,055,491 A | 10/1977 | Porath-Furedi | |
| 4,060,575 A | 11/1977 | Uhlirsch et al. | |
| 4,063,419 A | 12/1977 | Garrett | |
| 4,087,870 A | 5/1978 | Palmer | |
| 4,090,266 A | 5/1978 | Price | |
| 4,100,641 A | 7/1978 | Pansini | |
| 4,117,683 A | 10/1978 | Rasmussen | |
| 4,119,535 A | 10/1978 | White | |
| 4,129,904 A | 12/1978 | Pansini | |
| 4,176,058 A | 11/1979 | Grobler | |
| 4,231,873 A * | 11/1980 | Swigger .................. | B65D 88/78 114/256 |
| 4,254,525 A | 3/1981 | Combest | |
| 4,263,759 A | 4/1981 | Miller | |
| 4,254,818 A | 10/1981 | Melamed | |
| 4,304,022 A | 12/1981 | Sommer | |
| 4,306,967 A | 12/1981 | Trautwein | |
| 4,338,697 A | 7/1982 | Broadwater | |
| 4,343,696 A | 8/1982 | Hung | |
| RE31,087 E | 11/1982 | Sohl | |
| 4,402,101 A | 9/1983 | van Zyl | |
| 4,464,215 A | 8/1984 | Cogliano | |
| 4,519,914 A | 5/1985 | Etani | |
| 4,548,371 A | 10/1985 | Dempsey | |
| 4,572,767 A | 2/1986 | McCord | |
| 4,581,075 A | 4/1986 | St. Martin | |
| 4,592,291 A | 6/1986 | Sullivan, III | |
| 4,640,784 A | 2/1987 | Cant | |
| 4,652,378 A | 3/1987 | Marikovsky et al. | |
| 4,692,956 A | 9/1987 | Kassis | |
| 4,752,740 A | 6/1988 | Steininger | |
| 4,767,511 A | 8/1988 | Aragon | |
| 4,768,532 A | 9/1988 | Johnson | |
| 4,776,053 A | 10/1988 | Kiraly | |
| 4,835,810 A | 6/1989 | Hugo | |
| 4,849,024 A | 7/1989 | Supra | |
| 4,880,547 A | 11/1989 | Etani | |
| 4,889,622 A | 12/1989 | Newcombe-Bond | |
| 4,909,266 A | 3/1990 | Massa | |
| 4,931,187 A | 6/1990 | Derham et al. | |
| 4,944,872 A * | 7/1990 | Kantor .................. | B63B 35/44 210/170.05 |
| 4,948,296 A | 8/1990 | Salter | |
| 4,952,398 A | 8/1990 | Tapin | |
| 5,028,321 A | 7/1991 | Stone et al. | |
| 5,039,427 A | 8/1991 | Conover | |
| 5,080,783 A * | 1/1992 | Brown .................. | E02B 15/045 210/170.05 |
| 5,106,229 A | 4/1992 | Blackwell | |
| 5,107,872 A | 4/1992 | Meincke | |
| 5,108,514 A | 4/1992 | Kisner | |
| 5,143,623 A | 9/1992 | Kroll | |
| 5,164,094 A | 11/1992 | Stuckart | |
| 5,172,445 A | 12/1992 | Chandler | |
| 5,245,723 A | 9/1993 | Sommer | |
| 5,268,092 A | 12/1993 | Eden | |
| 5,293,659 A | 3/1994 | Rief et al. | |
| 5,337,434 A | 8/1994 | Erlich | |
| 5,342,570 A | 8/1994 | Ledoux et al. | |
| 5,346,566 A | 9/1994 | White | |
| 5,398,361 A | 3/1995 | Cason | |
| 5,411,889 A | 5/1995 | Hoots et al. | |
| 5,422,014 A | 6/1995 | Allen et al. | |
| 5,454,129 A | 10/1995 | Kell | |
| 5,482,630 A | 1/1996 | Lee et al. | |
| 5,569,371 A | 10/1996 | Perling | |
| 5,616,239 A | 4/1997 | Wendell et al. | |
| 5,662,940 A | 9/1997 | Hight et al. | |
| 5,782,480 A | 7/1998 | Phillips | |
| 5,802,631 A | 9/1998 | Friedman | |
| 5,833,841 A | 11/1998 | Koslowsky | |
| 5,842,243 A | 12/1998 | Horvath et al. | |
| 5,985,156 A | 11/1999 | Henkin et al. | |

(56) References Cited

U.S. PATENT DOCUMENTS

| | | | |
|---|---|---|---|
| 6,017,400 A | 1/2000 | Clark et al. | |
| 6,149,819 A | 11/2000 | Martin et al. | |
| 6,224,826 B1 | 5/2001 | Katakura et al. | |
| 6,228,272 B1 | 5/2001 | Gola | |
| 6,231,268 B1 | 5/2001 | Hausenbauer | |
| 6,280,639 B1 | 8/2001 | Ortiz | |
| 6,284,144 B1 | 9/2001 | Itzhak | |
| 6,303,038 B1 | 10/2001 | Sanders et al. | |
| 6,317,901 B1 | 11/2001 | Corpuel | |
| 6,358,409 B1 | 3/2002 | Jacoby, Jr. et al. | |
| 6,409,926 B1 | 6/2002 | Martin | |
| 6,419,840 B1 | 7/2002 | Meincke | |
| 6,444,176 B1 | 9/2002 | Yoshinaga et al. | |
| 6,539,573 B1 | 4/2003 | Caccavella | |
| 6,620,315 B2 | 9/2003 | Martin | |
| 6,896,799 B2 | 5/2005 | Ohanian | |
| 7,163,619 B2 | 1/2007 | Wang | |
| 7,189,314 B1 | 3/2007 | Pace et al. | |
| 7,252,843 B2 | 8/2007 | Moore et al. | |
| 7,820,055 B2 | 10/2010 | Fischmann Tones | |
| 7,832,959 B1 | 11/2010 | Groen et al. | |
| 7,862,712 B2 | 1/2011 | Tak | |
| 8,062,514 B2 | 11/2011 | Fischmann Torres | |
| 8,070,942 B2 | 12/2011 | Fischmann Torres | |
| 8,153,010 B2 | 4/2012 | Duarte et al. | |
| 8,388,837 B2 | 3/2013 | Tormaschy et al. | |
| 8,454,838 B2 | 6/2013 | Fischmann | |
| 8,465,651 B2 | 6/2013 | Fischmann | |
| 8,518,269 B2 | 8/2013 | Fischmann | |
| 8,524,088 B2 | 9/2013 | Arbogast et al. | |
| 2002/0117430 A1 | 8/2002 | Navarro et al. | |
| 2003/0046933 A1 | 3/2003 | Moss et al. | |
| 2003/0091467 A1 | 5/2003 | Kmec et al. | |
| 2003/0094421 A1 | 5/2003 | Gargas | |
| 2003/0228195 A1 | 12/2003 | Mizutani | |
| 2004/0025269 A1 | 2/2004 | Pichon | |
| 2004/0129644 A1 | 7/2004 | Unhoch | |
| 2004/0211450 A1 | 10/2004 | Stoltz | |
| 2004/0217326 A1 | 11/2004 | Souter et al. | |
| 2004/0226896 A1 | 11/2004 | Lovestead et al. | |
| 2005/0009192 A1 | 1/2005 | Page | |
| 2005/0016906 A1 | 1/2005 | Gettman | |
| 2005/0063782 A1 | 3/2005 | Stoecker et al. | |
| 2005/0091934 A1 | 5/2005 | Kantor | |
| 2005/0145552 A1 | 7/2005 | Sheets | |
| 2005/0194322 A1 | 9/2005 | Palmer | |
| 2005/0207939 A1 | 9/2005 | Roussi et al. | |
| 2006/0054568 A1 | 3/2006 | Jones et al. | |
| 2006/0169322 A1 | 8/2006 | Torkelson | |
| 2006/0174430 A1 | 8/2006 | Pareti | |
| 2006/0265820 A1 | 11/2006 | Erlich et al. | |
| 2006/0283808 A1 | 12/2006 | Kadlec et al. | |
| 2007/0059562 A1 | 3/2007 | Hattori et al. | |
| 2007/0181498 A1 | 8/2007 | Kaas | |
| 2007/0181510 A1 | 8/2007 | Harvey et al. | |
| 2008/0116142 A1 | 5/2008 | Fischmann Torres | |
| 2008/0190849 A1* | 8/2008 | Vuong | B01D 61/08 210/652 |
| 2008/0295615 A1 | 12/2008 | Sihalla | |
| 2009/0050572 A1 | 2/2009 | McGuire et al. | |
| 2009/0087549 A1 | 4/2009 | Zhou et al. | |
| 2010/0108490 A1 | 5/2010 | Hamers et al. | |
| 2010/0320147 A1 | 12/2010 | McGuire et al. | |
| 2011/0009019 A1 | 1/2011 | Neira et al. | |
| 2011/0061194 A1 | 3/2011 | Fischmann Torres | |
| 2011/0062067 A1 | 3/2011 | Fischmann Torres | |
| 2011/0108472 A1 | 5/2011 | Kania | |
| 2011/0108490 A1 | 5/2011 | Fischmann Torres | |
| 2011/0110076 A1 | 5/2011 | Langner | |
| 2011/0132815 A1 | 6/2011 | Angelilli et al. | |
| 2011/0137465 A1 | 6/2011 | Angelilli et al. | |
| 2011/0210076 A1 | 9/2011 | Fischmann Torres | |
| 2011/0253638 A1 | 10/2011 | Easland et al. | |
| 2012/0024794 A1* | 2/2012 | Fischmann | B01D 21/30 210/665 |
| 2012/0024796 A1 | 2/2012 | Fischmann Torres | |
| 2012/0091069 A1 | 4/2012 | Fischmann Torres | |
| 2012/0103445 A1* | 5/2012 | Santamaria | F17D 3/00 137/565.01 |
| 2012/0216837 A1 | 8/2012 | Kovarik et al. | |
| 2013/0213866 A1 | 8/2013 | Fischmann Torres | |
| 2013/0240432 A1 | 9/2013 | Fischmann Torres | |
| 2013/0264261 A1 | 10/2013 | Fischmann Torres | |
| 2013/0306532 A1 | 11/2013 | Fischmann Torres | |
| 2014/0190897 A1 | 7/2014 | Wilson | |

FOREIGN PATENT DOCUMENTS

| | | |
|---|---|---|
| DE | 2 141 460 | 2/1973 |
| DE | 38 44 374 | 7/1990 |
| DE | 19515428 | 11/1996 |
| DE | 297 16 994 | 1/1998 |
| DE | 198 14 705 | 10/1998 |
| DE | 198 60 568 | 12/1998 |
| DE | 10 2010 019 510 | 11/2011 |
| EP | 0 352 487 | 1/1990 |
| EP | 0 468 876 | 1/1992 |
| EP | 0 483 470 | 5/1992 |
| EP | 1 420 130 | 5/2004 |
| EP | 168 85 62 | 8/2006 |
| ES | 200 14 29 | 5/1998 |
| FR | 2 544 005 | 10/1984 |
| FR | 2 668 527 | 4/1992 |
| FR | 2 685 374 | 6/1993 |
| FR | 2 740 493 | 4/1997 |
| FR | 2 785 898 | 5/2000 |
| GB | 1494005 | 12/1977 |
| GB | 2045606 | 11/1980 |
| GB | 2 243 151 | 10/1991 |
| JP | 59-012287 | 1/1984 |
| JP | 59-222294 | 12/1984 |
| JP | 4-115008 | 4/1992 |
| JP | 5-220466 | 8/1993 |
| JP | 04073612 | 8/1993 |
| JP | 5-261395 | 10/1993 |
| JP | 7-310311 | 11/1995 |
| JP | 3026643 | 1/1996 |
| JP | 10-169226 | 6/1998 |
| JP | 2001-3586 | 1/2001 |
| JP | 2001-9452 | 1/2001 |
| JP | 2002-90339 | 3/2002 |
| JP | 2002-282860 | 10/2002 |
| JP | 2003-190989 | 7/2003 |
| JP | 2003-200173 | 7/2003 |
| JP | 2004-958 | 1/2004 |
| JP | 2005-288392 | 10/2005 |
| JP | 2006-68624 | 3/2006 |
| JP | 2007-500073 | 1/2007 |
| JP | 2011-5463 | 1/2011 |
| KR | 20-0162956 | 9/1999 |
| TW | 432013 | 8/1987 |
| TW | 482186 | 12/1990 |
| UY | 30184 | 5/2007 |
| WO | WO 8101585 | 6/1981 |
| WO | WO 9848132 | 10/1998 |
| WO | WO 03/010388 | 2/2003 |
| WO | WO 2006/069418 | 7/2006 |
| WO | WO 2007/029277 | 3/2007 |
| WO | WO 2007/059562 | 5/2007 |
| WO | WO 2009/114206 | 9/2009 |
| WO | WO 2010/074770 | 7/2010 |

OTHER PUBLICATIONS

Ballentine, "Ambient Water Quality Criteria for Bacteria—1986", Jan. 1986, United States EPA, EPA440/5-84-002, p. 16.

Chilean Examiner's report from Application No. 3900-08 issued Aug. 31, 2009.

Communication from EPO for corresponding application No. 09835402.0 dated Jan. 30, 2013.

Eurasian Office Action for corresponding application No. 201001477/31 and response to Office Action dated Apr. 2, 2013 with English Translation.

(56) References Cited

OTHER PUBLICATIONS

European Search Report from European Application No. 07 07 5995 dated Mar. 9, 2010.
International Search Report and Written Opinion for International Application No. PCT/US2011/051129 dated Feb. 8, 2012.
International Search Report and Written Opinion for International Application No. PCT/US2011/051236 dated Jan. 26, 2012.
International Search Report and Written Opinion for International Application No. PCT/US2011/051244 dated Jan. 25, 2012.
International Search Report and Written Opinion for PCT/EP2012/076170 dated Aug. 5, 2013.
International Search Report dated May 6, 2009, in co-pending related PCT Application No. PCT/US2009/036809.
Japanese Office Action for corresponding application No. 2007-299975 dated May 31, 2011—translation provided.
Norwegian Search Report from Norwegian Application No. 20075880 dated Feb. 4, 2010.
Pakistan Examination Report, 2010.
Panama Search Report from Panama Application No. 87176-01 dated Mar. 17, 2010.
Panama Search Report from Panama Application No. 88509-01 dated Oct. 7, 2010.
Peruvian Technical Report for corresponding application No. 000244-2007 dated Sep. 2, 2010—translation provided.
Response filed for EP 09835402.0 dated Aug. 14, 2013. (9 pages).
Response filed for EP 09835402.0 dated Jul. 23, 2013. (11 pages).
Second Singapore Office Action for corresponding application No. 200717963-3 dated Dec. 23, 2010.
Singapore Office Action for corresponding application No. 200717963-3 dated Dec. 23, 2010.
World Health Organization: Guidelines for safe recreational waters. vol. 2. Swimming pools and similar recreational water environments. Switzerland. Jun. 27, 2006 ISBN 92-4-154680-8 Chapter 4.
World Health Organization: Guidelines for safe recreational waters. vol. 2. Swimming pools and similar recreational water environments. Switzerland. Jun. 27, 2006 ISBN 92-4-154680-8 Chapter 5.
International Search Report and Written Opinion for International Application No. PCT/IB2014/002991 dated May 18, 2015 (15 pages).
International Search Report and Written Opinion for International Application No. PCT/IB2014/002991 dated May 18, 2015.
International Search Report and Written Opinion for PCT/IB2014/065981, dated Mar. 18, 2015.
International Search Report and Written Opinion for International Application No. PCT/IB2014/002891 dated Apr. 29, 2015.
Office Action for co-pending U.S. Appl. No. 14/823,052, dated Apr. 17, 2017.

* cited by examiner

FLOATING LAKE SYSTEM AND METHODS OF TREATING WATER WITHIN A FLOATING LAKE

CROSS REFERENCE TO RELATED APPLICATIONS

The present application claims priority from U.S. Provisional Patent Application No. 61/900,308, filed, Nov. 5, 2013, herein incorporated by reference in its entirety.

FIELD

The present invention refers to a method and system for treating and building floating lakes, which are built within large water bodies, where the water quality and/or esthetic characteristics within the floating lakes comply with differing recreational or more stringent standards.

BACKGROUND

Throughout the world, there are a large number of water bodies in which the microbiological, physicochemical, and/or esthetic conditions of the water body are not acceptable for recreational purposes, such as bathing and the practice of watersports having direct contact with the water. The quality of the water in these water bodies is such that it poses potential sanitary and safety risks to people coming into direct contact with the water. In addition, the esthetic conditions of these water bodies may be not attractive, pleasing, and/or ideal which may further discourage recreational use. Golf course ponds, retention ponds, public park ponds, dams, rivers, lakes, the ocean, ocean bays, river bays, and the like are examples of water bodies that may have microbiological, physicochemical, and/or esthetic conditions rendering the water body unsuitable for recreational uses. These water bodies can be found in the middle of crowded cities, in rural, or in low-population locations.

As the population of the world continues to increase, land is becoming a scarce resource with many land areas becoming occupied at a high speed. Coastal areas attract many people due to the proximity to the sea or rivers. However, the rapid development of these areas often results in available land being utilized for housing or industry which limits the opportunity to use the areas for recreational purposes. In non-coastal areas, many people do not have access to or live near water bodies having water quality and/or esthetic conditions suitable for recreational use. Within crowded cities that have natural or artificial water bodies, available land is typically utilized for housing or industry leaving no available inland spaces for generating water bodies that can improve the quality of life of the people in these cities by providing opportunity for the practice of water sports and other recreational uses associated with a water body. In addition, water bodies located within densely populated areas may not be suitable for recreational use due to debris, pollution, and/or unsafe conditions of the water body (such as sloped bottoms, poor clarity, and unknown underwater topography).

Many people around the world aspire to have access to locations having water bodies similar to tropical seas, where the water quality has low turbidity, high transparency and clarity that generates a crystal clear water effect, and white sand bottoms that create an esthetic feature that is attractive and desirable. The water clarity within tropical seas attracts tourists from all over the world. For example, in 2012, areas in and around the Caribbean welcomed nearly 25 million tourists, 5.4% more than in 2011 and it is expected that such number will continue to increase annually. Given the large number of water bodies throughout the world, there is a need to transform current unaesthetic and poor water quality water bodies in order to be able to effectively use them for recreational purposes in a safe manner. It therefore would be desirable to transform a water body or a portion thereof to provide a water body having the water quality and esthetic qualities provided by a tropical sea. The ability to transform such water bodies would provide for the economic development of local communities, as well as improvement of the lifestyle of a larger section of people all around the world by bringing an attractive tropical sea environment to an existing water body not suitable for recreational purposes.

Several studies have been performed on U.S. lakes, reservoirs, and ponds. For example, of the more than 17 million acres of lakes, reservoirs and ponds assessed, more than 44% were found to be impaired for one or more uses. These water bodies were found to be affected by nutrients, metals, siltation, total dissolved solids, and excess algal growth among other effects. It was determined that more than 41% of lakes within the U.S. pose a high or moderate risk for potential exposure to algal toxins, which could potentially have wide ranging impacts on human health. These studies also found that there are more than 140,000 water bodies that potentially could be used for recreational purposes, such as bathing or for the practice of aquatic sports having direct contact with the water, if the water quality and/or esthetic conditions were more suitable. Generally, these water bodies are not suitable for recreational purposes due to poor water quality and/or esthetic conditions that do not comply with recreational or esthetic water quality standards.

In addition, many existing water bodies, both natural and artificial, are not suitable for recreational purposes and water sports due to safety reasons associated with physical hazards, such as strong currents, dangerous shorelines, and/or uncertain or dangerous bottom features, and virtually none of them have the esthetic characteristics of tropical seas. In these water bodies, bathers or those participating in water sports may be exposed to one or more risks. For example, drowning can occur if bathers or water sport participants are caught in tidal or other types of currents or caught by submerged obstacles. Bathers or water sport participants can also be injured by slipping or falling into rocks or general types of debris and/or by beach areas or other shoreline areas having slopes that may be misjudged and pose safety hazards.

In order to allow for recreational purposes, a water body generally must comply with specific stringent regulations to avoid microbial and/or physiochemical contamination that may cause negative health effects for recreational users. This is of special importance in specific population groups that have higher risk of disease, such as the young and the elderly. Also, the effects of algae should be taken in account, as several human diseases have been reported that are associated with toxic species of algae that may be found in water bodies. Such regulations aim to control the microbacteriological and/or physiochemical quality of the water to provide water that is safe for recreational use involving direct contact with the water.

There are also many water bodies which have water quality suitable for recreational purposes but they are not esthetically attractive due to bottoms that are covered with sediments, debris, and/or sludge that provide a dark and unpleasant coloration to the water body. Water quality requirements for recreational purposes therefore often include requirements directed to the esthetic condition of the water. These requirements generally provide that the water body should be free from floating debris, floating algae, oil, scum and other matter that may settle to form deposits, free from substances that can produce objectionable color, odor, taste or turbidity, and free from substances that produce undesirable aquatic life. Regulations require that the water from recreational areas be clear enough to allow the users to estimate depth, to be able to see submerged hazards easily, and to detect submerged debris or physical hazards, such as rocks and sloped bottoms. Generally, the amount of light that can reach the bottom of the water body is determinant on the clarity of the water. However, the depth of light penetration in natural or artificial water bodies can be affected by the suspended microscopic plants and animals, suspended mineral particles, stains that impart a color, oils and foams, and floating and suspended debris such as leaves, litter, and others.

There are many locations throughout the world that could benefit from large water bodies having suitable water quality and/or esthetic conditions for recreational purposes and the practicing of nautical sports. However, such large water bodies cannot be treated with current technologies or with conventional swimming pool filtration technology for obvious reasons based in their large sizes, which would require new structures, and considerably high amounts of chemicals and energy. In many instances, structural modifications of the natural or artificial water bodies should also be performed to address esthetic conditions, such as changing a bottom that is covered with sediments, debris, and/or sludge, and hazardous conditions, such as providing safe slopes for beach areas, among other requirements. There are currently no economically viable technologies that provide for completely changing all of the water quality of large lakes or other large natural or artificial water bodies and/or providing an attractive coloration to water bodies which already possess good water quality but have unaesthetic characteristics that discourage recreational use. Therefore, there is a need for a system and methods capable of transforming a natural or artificial water body to provide an area within the water body having water quality and/or esthetic qualities suitable for recreational use and the practice of nautical sports.

PREVIOUS ART

U.S. Pat. No. 4,087,870 discloses a floating swimming pool assembly that includes walls made from a flexible sheet, a buoyant rim portion, and a filter assembly. The floating swimming pool is designed for conventional swimming pool treatment and provides operational characteristics similar to a permanent pool installation, such as a conventional centralized filtration system that filters the total water volume of the floating pool from 1 to 6 times per day and a permanent chemical concentration. Such a system would not be suitable for use with a large floating lake, as it uses conventional swimming pool water treatment and filtration technology that is technically and economically not viable to apply in a large floating lake.

U.S. 2005/0198730 discloses a floating swimming pool apparatus. The main structural components of the apparatus are constructed of a waterproof glass fiber reinforced plastic that is rigid, which results in considerably high costs of materials and does not provide the flexibility to cope with water movement and structural loads associated with a large floating lake. Also, such apparatus is very difficult to scale into large floating lakes due to their structural limitations.

SUMMARY

The present invention relates to floating lakes and to the treatment of the water in such lakes. The present invention further relates to large floating lakes installed within a natural or artificial water body.

The dimensions of the floating lake, including depth and surface area of the floating lake, may vary based on need and existing resources, as well as the surface area and other physical features of the water body. The floating lake can be provided with a chemical application system; a filtration system including a mobile suctioning device and filters; a skimmer system and may also comprise a coordination system. The system and method of the present invention can be configured to provide significant cost savings due to lower capital cost, energy consumption and chemical usage than conventional systems. This is due to the activation of the methods from the present application based on the real requirements of the water body, through assessment of specific variables, also due to the lower ORP standards required compared to conventional swimming pool treatment, and due to the use of an efficient filtration system based on the color of the bottom of the floating lakes.

The present invention relates to a method for treatment of water in a floating lake installed in a water body, the floating lake having walls and a bottom, wherein the bottom of the floating lake is constructed of a flexible material having a Young modulus of up to 20 GPa. The method generally comprises applying an oxidant to the water in the floating lake to maintain an ORP level of at least 550 mV for a minimum of about 10 to about 20 hours within a 52-hour cycle; applying a flocculant to the water in the floating lake before the turbidity of the water body exceeds 5 NTU; suctioning with a mobile suctioning device when the color black component of the bottom of the floating lake exceeds 30% on a CMYK scale, wherein the mobile suction device suctions a portion of water from the bottom of the floating lake containing settled solids; filtering the water suctioned by the mobile suctioning device and returning the filtered water to the floating lake; and supplying water to the floating lake to maintain a positive pressure of at least 20 Newtons per square meter of the surface area of the floating lake, wherein the positive pressure is maintained for at least 50% of the time within 7-day intervals and wherein water is supplied to the floating lake at a replacement rate according to the following equation:

$$\text{Replacement Rate} \geq \text{Evaporation Rate} + \text{Cleaning rate} + \text{Leakage rate}.$$

The present invention also relates to the structure of a floating lake. A floating lake of the invention generally comprises a flexible bottom having a Young modulus of less than about 20 GPa; walls having a rim, wherein the rim comprises a flotation system; a pumping system for maintaining a positive pressure of at least 20 Newtons per square meter of the surface area of the floating lake, wherein the positive pressure is maintained for at least 50% of the time within 7-day intervals; a chemical application system for applying chemicals such as an oxidant or flocculant to the water in the floating lake, a mobile suctioning device capable of moving along the flexible bottom of the floating lake and suctioning a portion of water from the bottom containing settled solids, a filtration system in fluid communication with the mobile suctioning system, wherein the filtration system receives the portion of water suctioned by the mobile suction system; a return line for returning the filtered water the from filtration system to the floating lake. The system may also comprise a coordination system, wherein the coordination system activates the operation of the chemical application system.

DETAILED DESCRIPTION

Figure 1:
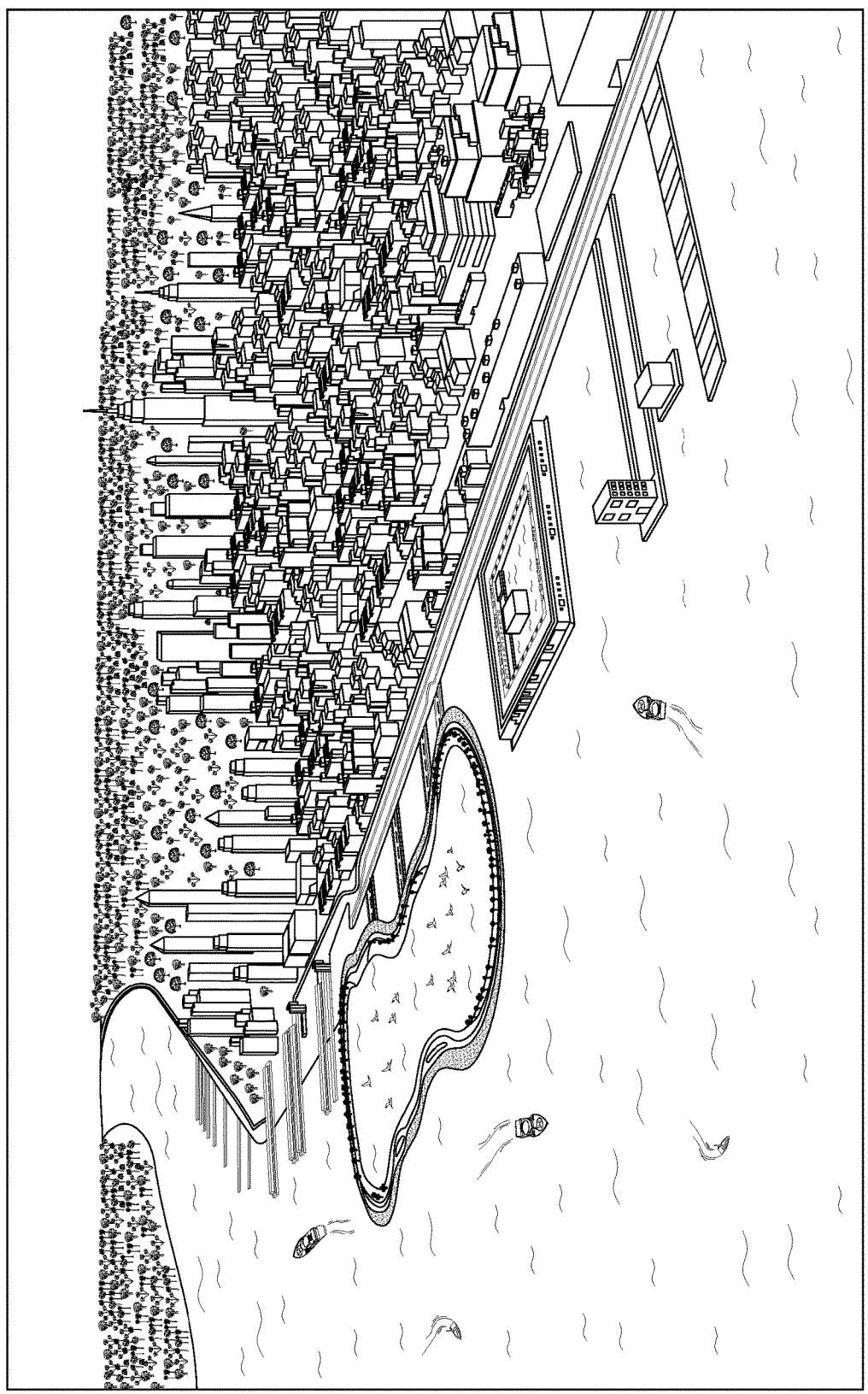
FIG. 1 shows an embodiment of a floating lake according to the present invention.

The following detailed description refers to the accompanying drawings. While embodiments of the invention may be described, modifications, adaptions, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the scope of the invention. While systems and methods are described in terms of "comprising" various apparatus or steps, the systems and methods can also "consist essentially of" or "consist of" the various apparatus or steps, unless stated otherwise.

Systems and Methods of the Present Invention

The present invention relates to floating lake systems and methods for treating and maintaining quality of water in the floating lakes.

The present invention relates to large floating lakes with crystal clear water similar to tropical seas, where the large floating lakes are generally installed within a natural or artificial water body, such as an ocean, river, lake, reservoir, lagoons, dams, ponds, canals, harbors, estuaries, streams, ocean bays, river bays, or other bodies of water. While the invention presents embodiments as "within" various water bodies, it will be appreciated by those skilled in the art that the embodiment may include an edge that is adjacent to a shoreline or beach.

The present application also relates to a method for the treatment of large floating lakes, in order to take advantage of bodies of water throughout the world that suffer from poor water quality and/or poor esthetic characteristics, and to help improve the quality of life of people around the world. The floating lakes of the present application allow for recreational uses, along with practicing aquatic sports in safe conditions, and may generate an unprecedented geographic impact in the amenities of cities around the world. The floating lakes from the present application generate an esthetic feature that could not be economically generated with current technologies, causing a major impact in the use of natural or artificial bodies of water that were not considered useful before.

The dimensions of the floating lake, including depth and surface area of the floating lake, may vary based on need and existing resources, as well as the surface area and other physical features of the water body, such as underwater obstacles, depth, and the like, into which the floating lake is constructed. For example, in some embodiments, the floating lake may have a surface area of at least 5,000 m$^2$, or at least 10,000 m$^2$, or at least 20,000 m$^2$.

An embodiment of the method for treatment is directed to providing treatment of large floating lakes that are installed within natural or artificial water bodies. Such natural or artificial water bodies may have water quality that does not comply with sanitary and/or esthetic requirements for recreational purposes, or with more stringent requirements. Specially designed floating lake systems are provided, which allow applying the method from the present invention.

Figure 2:
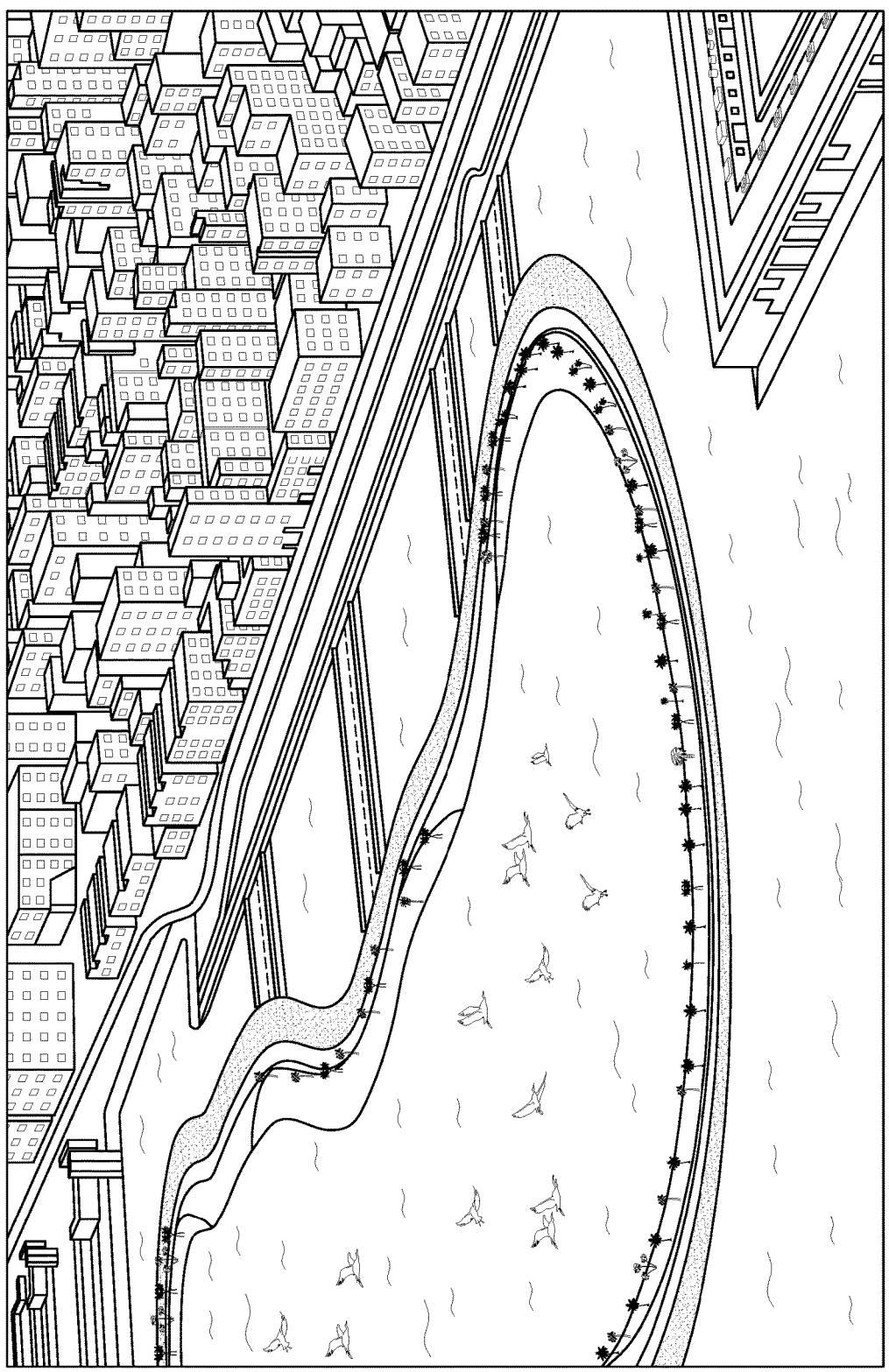
FIG. 2 shows a close up of an embodiment of a floating lake according to the present invention.

According to the embodiments, the floating lake may be installed in natural or artificial waters. FIGS. 1 and 2 show an exemplary embodiment of a floating lake installed in a natural waterway. The floating lake can, for example, provide a recreational water feature in a city or other municipality in an area that otherwise does not offer water quality and/or esthetic conditions suitable for recreational uses. The floating lake may be installed to improve water conditions that are unsuitable for recreational uses due to chemical or biological pollution, safety concerns, or esthetic reasons.

The floating lake may be constructed to provide buoyancy and to accommodate changes in the water level of the surrounding body of water. For example, the floating lake system may be designed to be able to float with changes in water level of the surrounding water body. In such case, when the water level of the surrounding water body lowers (e.g., at low tide), the complete floating lake system may be lowered with the surface of the natural water body. On the other hand, when the water level of the surrounding water body rises, the floating lake may rise with it. This is because flotation systems of the floating lake systems provide buoyancy to the floating lake and are able to maintain the surface of the floating lake at or near the level of the surrounding water body's surface. In alternative embodiments, at least some part of the bottom of the floating lake may come into contact with the bottom of the surrounding water body at low water levels, or may be in contact with the bottom at all times.

Changes in water levels and movement of the water in the floating lake and the surrounding body of water due to tides, currents, and natural waves caused by wind and other phenomena can cause changes in pressure against or a load on the bottom of the floating lake. The structural stability of the floating lake can be taken into account in designing the structure, for example, for coping with loads generated when the structure is vertically fixed in a position relative to the bottom of the surrounding water body. The structure can be designed for coping with such loads by providing a flexible but stable bottom that may oscillate or move according to the motion of the surrounding water body. Also, the structure may comprise an anchoring system that provides vertical and/or horizontal support to the floating lake system to cope with underwater forces.

Figure 3:
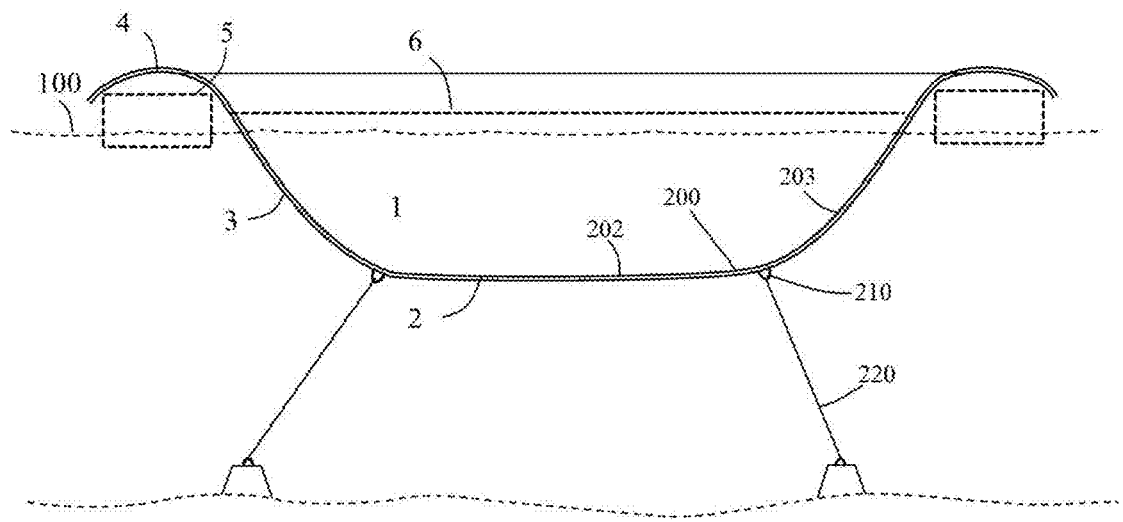
FIG. 3 is a schematic illustration of the cross section of a floating lake according to the present invention.

According to an embodiment shown in FIG. 3, the floating 1 lake may comprise a flexible bottom 2 and walls 3. The bottom 2 and walls 3 may comprise a liner 200 constructed of non-permeable materials that are capable of maintaining a body of water inside the floating lake and essentially separate the water on the inside of the floating lake from the surrounding artificial or natural body of water. Examples of suitable materials include, but are not limited to, rubbers, plastics, Teflon, low density polyethylene, high density polyethylene, polypropylene, nylon, polystyrene, polycarbonate, Polyethylene Terephthalate, fibers, fiberboard, wood, polyamides, PVC membranes, fabrics, composite fabrics, geomembranes, acrylics, among others, and combinations thereof. The liner 202 of the bottom 2 may be continuous with the liner 203 of the walls 3. In an alternative embodiment, the liner 202 of the bottom 2 is constructed of different materials than the liner 203 of the walls 3.

According to an embodiment, the bottom 2 and/or walls 3 comprise a plurality of layers, where such layers may be the same or different materials, and which may vary in their permeability. Additional layers can be provided to help avoid water leakage from the floating lake into the surrounding water body. In order to reduce loss of water from the floating lake to the surrounding body of water, a collection or drainage system can be provided between different layers of the bottom. Also, various structures can be used to provide a certain level or rigidity to the bottom and/or walls of the floating lake. A bottom 2 with a certain amount of flexibility can be better able to resist punctures, breakages, and other damage to the floating lake 1.

The Young's modulus or elastic modulus of a material is a measure of the elasticity of the material. Higher numbers indicate a stiffer material and lower numbers a more elastic material. In order to provide a flexible bottom, the Young's modulus of the materials or components used in the bottom 2 is typically no more than about 100 GPa, about 50 GPa, about 20 GPa or about 15 GPa or 10 GPa, allowing the bottom component to have flexibility and return to its natural state instead of considerably deforming or breaking due to loads applied to the material by the surrounding water, water in the floating lake or pressures resulting from, e.g., action of a mobile suction device.

According to embodiments, the liner 200 is made from flexible components with a Young's modulus of up to about 20 GPa. In an embodiment, the liner 200 is made from flexible components with a Young's modulus of up to about 10 GPa. In another embodiment, the liner 200 is made from flexible components with a Young's modulus of about 0.01 to about 20 GPa. In another embodiment, the liner 200 is made from flexible components with a Young's modulus of about 0.01 to about 15 GPa. In yet another embodiment, the liner 200 is made from flexible components with a Young's modulus of about 0.01 to about 10 GPa. Different portions of the liner 200 (e.g., bottom liner 202 or wall liner 203) may be constructed of different components.

The flexible bottom 2 provides many benefits to the floating lake 1. For example, a flexible bottom 2 offers a low cost option for the floating lake structures, can withstand pressure without being punctured or damaged, is easy to install, and can accommodate movement of the water inside and outside of the floating lake. On the other hand, a completely rigid bottom would be very expensive, difficult to install, and would easily be damaged due to the large loads generated by the surrounding water body. By using completely rigid bottoms, the loads generated by the surrounding water could cause the materials to become loose, the structure to break, and the water contained within the floating lake to be contaminated and mixed with the surrounding water, therefore not achieving the required water quality and/or esthetic conditions for recreational purposes.

Figure 4A:
FIGS. 4A to 4C are schematic illustrations of layered structures used in floating lakes of the present invention.
Figure 4B:
Figure 4C:
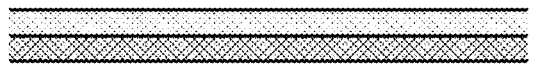

The bottom 2 of the floating lake 1 can comprise one or more materials and configurations. In embodiments, the floating lake 1 may have a bottom 2 configured in one or more layers. As shown in FIGS. 4A-4C, the bottom 2 may have a layered structure. In an embodiment shown in FIG. 4A, the layered structure of the bottom 2 may comprise a single layer. In another embodiment shown in FIG. 4B, the layered structure of the bottom 2 may comprise two layers. In yet another embodiment shown in FIG. 4C, the layered structure of the bottom 2 may comprise multiple layers.

The different layers may be combined to provide the bottom 2 with different characteristics, such as durability, non-permeability, stability, and stiffness and/or flexibility. In an embodiment, the bottom 2 and walls 3 are constructed of the same or similar materials. Alternatively, the bottom 2 may be constructed of different materials than the walls 3, or may have a different layered structure. The Young's modulus of the bottom material is used to refer to the bottom as a whole, which can comprise one or more different materials in different configurations.

According to embodiments, the bottom 2 comprises components or materials such as rubbers, plastics, Teflon, low density polyethylene, high density polyethylene, polypropylene, nylon, polystyrene, polycarbonate, polyethylene terephthalate, fibers, fiberboard, wood, polyamides, PVC membranes, fabrics, acrylics, among others, and combinations thereof that are capable of providing a flexible bottom with an overall Young's modulus of up to 20 GPa. In many embodiments, each of the layers of the bottom 2, independently, have a Young's modulus of at most 20 GPa.

In an exemplary embodiment, the bottom 2 and walls 3 comprise a fabric layer, for example a composite fabric, such as Hipora® waterproof fabric that consists of a nylon fabric with polyurethane injection with non-permeable characteristics. The fabric can be sewn and sealed to generate the bottom 2 and walls 3 of the floating lake 1, creating a structure that can hold the water in the floating lake 1 substantially separate from the surrounding water, and protect the water of the floating lake from infiltration of surrounding water.

In another exemplary embodiment, the bottom 2 and walls 3 comprise a layer of linear low-density polyethylene ("LLDPE"). For example, the bottom 2 and walls 3 may comprise a LLDPE geomembrane that can be thermo fused, welded, or glued together with a sealant suitable for prolonged contact with water. On another exemplary embodiment, the bottom 2 and walls 3 comprise a layer of a high-strength PVC material. Other suitable materials include geotextiles, PVC materials, elastomeric materials or polymer sprays or as multilayered bitumen geocomposites. The thickness of the liner can be any suitable thickness for the purpose and can be adjusted to fit the requirements of the floating lake 1, e.g., durability, puncture resistance, stability, and stiffness/flexibility. The thickness of the liner can be, for example, about 0.4 mm, 0.5 mm, 0.75 mm, 1 mm, or thicker. The liner can be included as a layer in a layered structure, such as the multilayered structure in FIG. 4C. Suitable sealants to join sections of the bottom 2 to each other or to the walls 2 are butyl tapes, being waterproof, self-bonding, pliable and flexible adhesive sealing tape capable of adhering to plastics. Water proof materials and sealing techniques, such as thermo fusion, welding or glue, also allow generating a structure that can substantially separate the water in the floating lake 1 from the surrounding water.

Figure 10A:
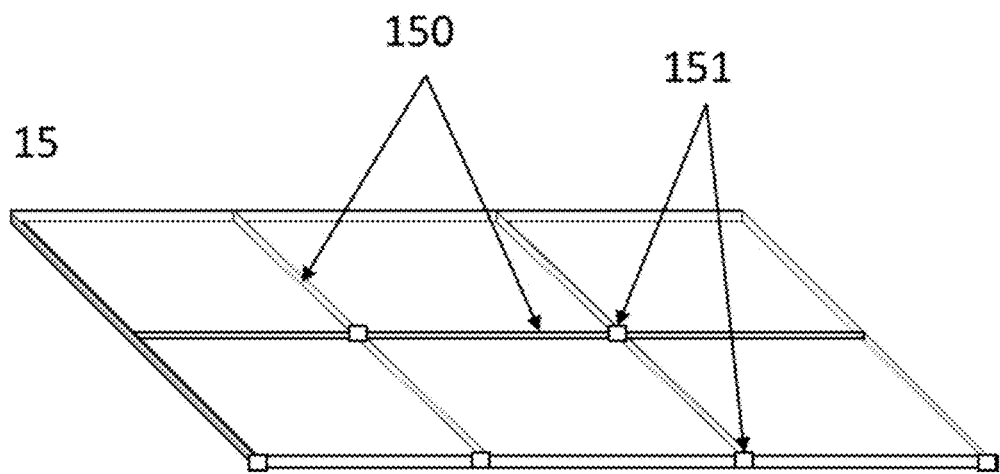
FIGS. 10A and 10B are schematic illustrations of a structural frame system for the floating lake of FIG. 1.
Figure 10B:
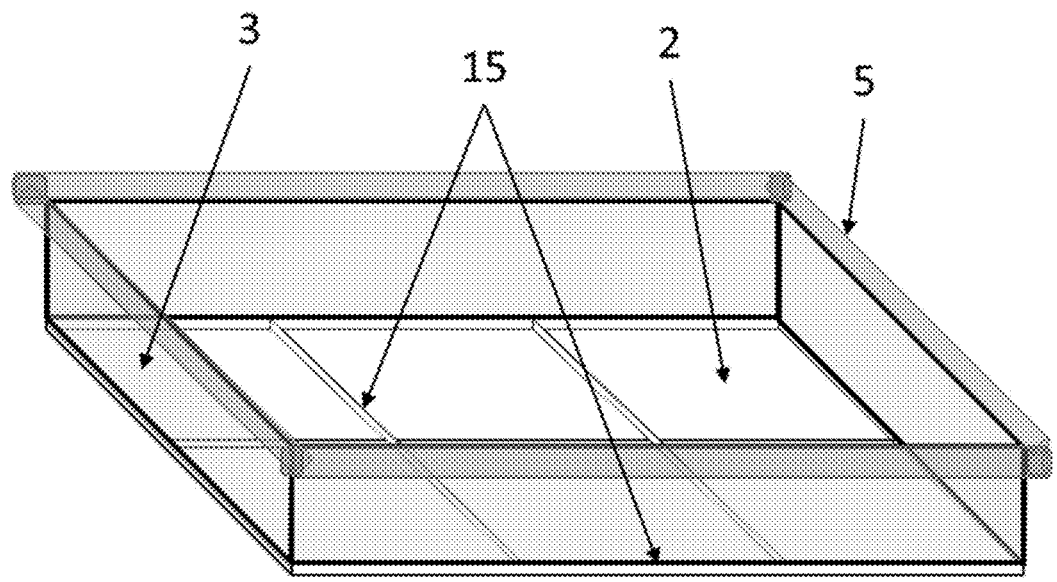

The bottom may also include one or more structural frames. The structural frames can be constructed to accommodate a modular configuration of the floating lake system. As can be seen in FIG. 10A, the floating lake 1 may comprise one or more structural frames 15 located at the bottom of the floating lake 1. The structural frames can be constructed to be positioned underneath or on top of the layered structure of the bottom 2, or between layers. However, the structural frames are preferably positioned underneath the bottom in order to provide the structure but not affect the non-permeability of the floating lake. The structural frame 15 may be joined together in a configuration based on the shape of the bottom of the floating lake 1 to provide additional stability to the bottom. In FIG. 10B, an embodiment of the floating lake 1 is shown, comprising a bottom 2 with structural frames 15, walls 3, and floatation systems 5. In at least some embodiments, structural frames 15 can also be provided in the walls 3 of the floating lake 1, to provide more stability and to maintain the shape of the floating lake 1. The structural frame 15 may be connected to the rim 4 and/or the flotation system 5.

The structural frame 15 may be constructed out of rigid or flexible materials. The materials can be selected to be suitable for conditions underwater, as the structural frame will be generally located underwater. Rigid frames, pipes, or profiles for generating a rigid structural frame can be constructed out of any suitable materials. Examples of rigid materials include metals, such as steel or aluminum, plastics, wood, and concrete, among other materials. Flexible frames, pipes, hoses, or profiles for generating a flexible structural frame can be constructed out of any materials suitable for constructing a flexible frame. Examples of flexible materials include plastics, rubbers, fabrics, and nylon, among other materials.

The structural frame 15 may be constructed from frame components 150 that may be connected together by using connectors 151. The connectors 151 and connector materials can be selected based on the design configuration and materials of the frame components 150. Frame connectors 151 can include flexible or rigid materials. Suitable frame connectors 151 include rings, mechanical joining systems such as welding, plates, screws, cords, among others. The connectors 151 can further be used to connect the frame components 150 to the rest of the floating lake's 1 structure.

Figure 5:
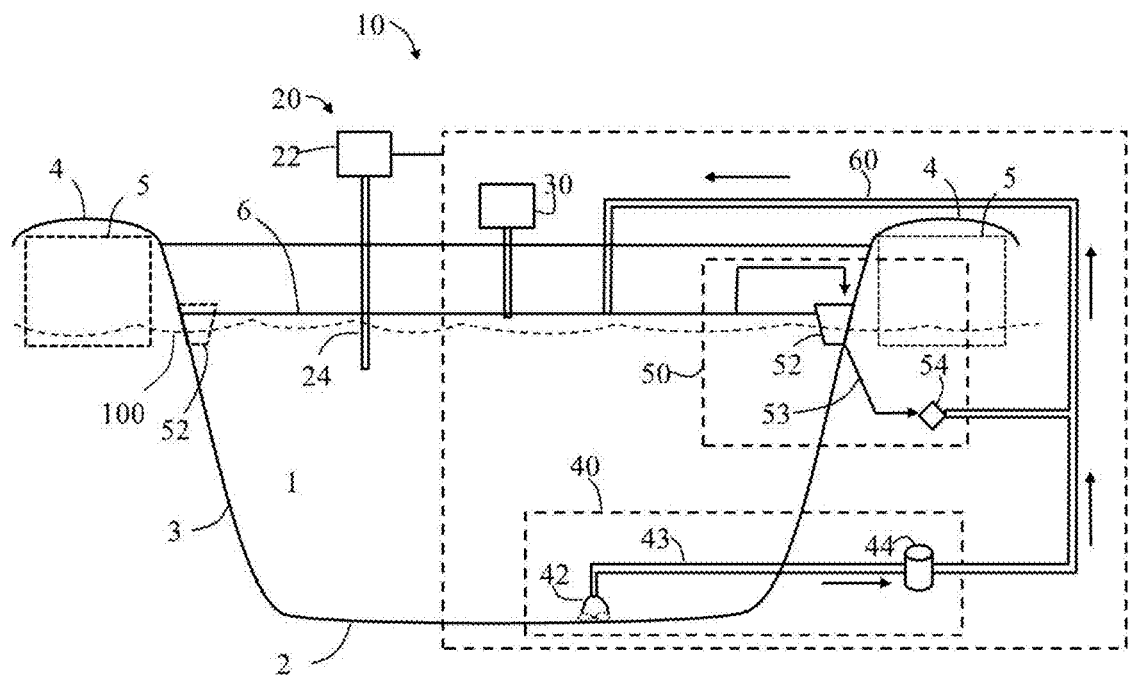
FIG. 5 is a schematic illustration of an embodiment of a floating lake according to the present invention.
Figure 6:
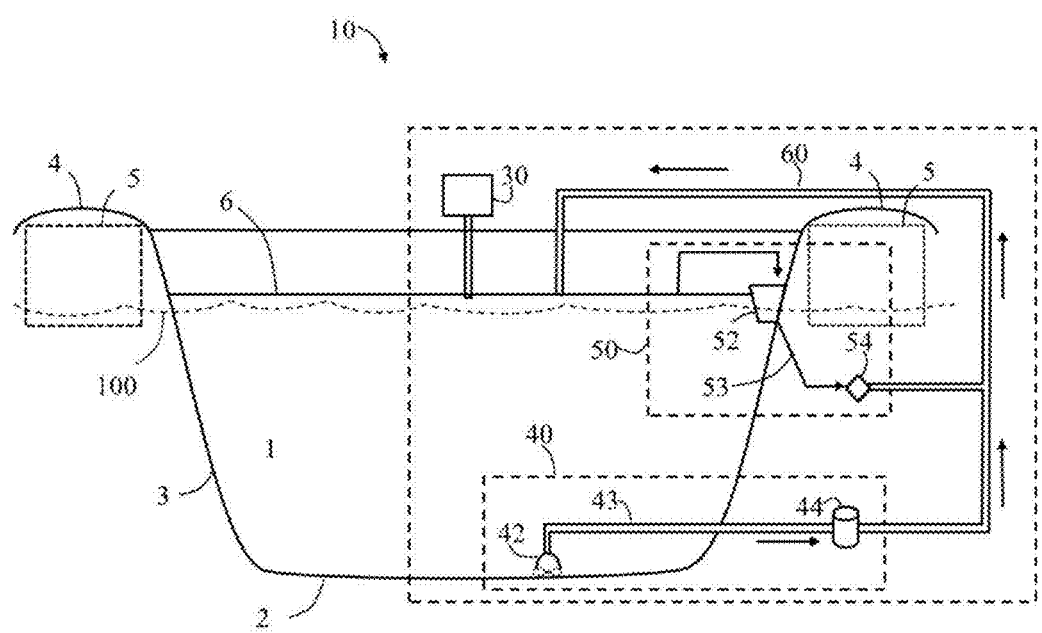
FIG. 6 is a schematic illustration of an embodiment of a floating lake according to the present invention.
Figure 7:
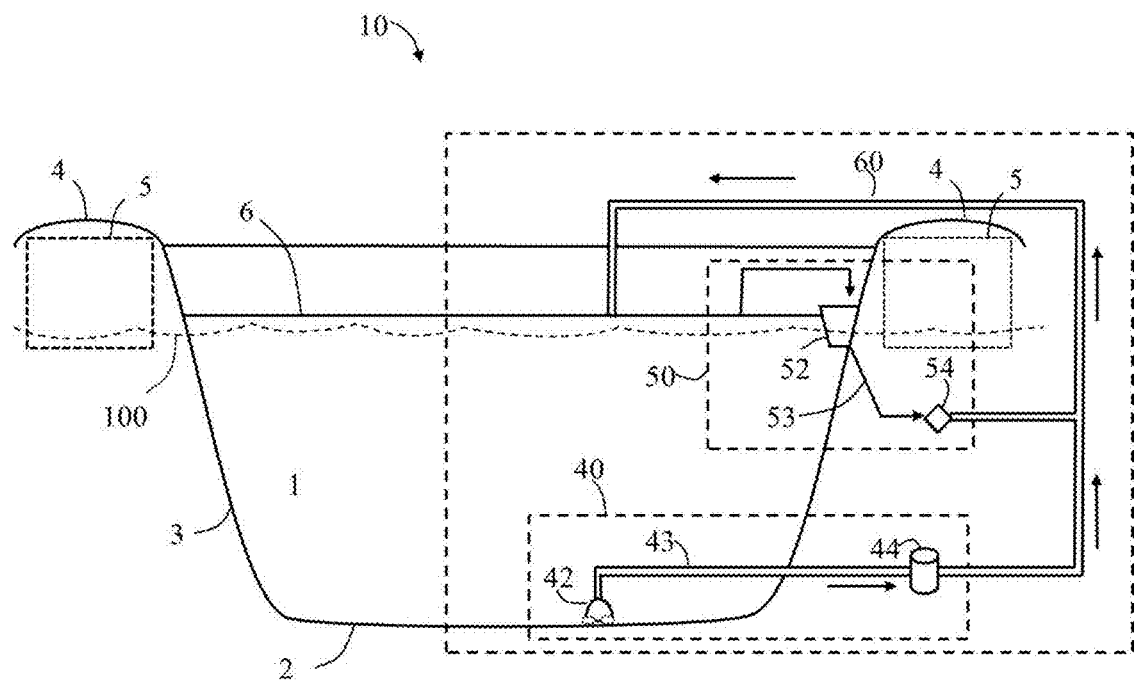
FIG. 7 is a schematic illustration of an embodiment of a floating lake according to the present invention.

According to embodiments, the walls 3 may additionally include a rim 4, as shown in FIGS. 3 and 5-7. The rim 4 may comprise structural frame components 150 and may be at least partially covered by the liner 200. The rim 4 of the floating lake 1 may comprise a flotation system 5 (shown in FIGS. 3 and 5-7). The flotation system 5 provides buoyancy and allows maintaining a water level in the floating lake 1 that generates a positive pressure in the floating lake 1. The flotation system 5 may also provide stability to the perimeter of the floating lake 1 and can help the floating lake 1 maintain its surface shape. The floatation system 5 may comprise a plurality of flotation elements distributed along the perimeter of the floating lake 1, or a continuous flotation element surrounding the perimeter of the floating lake 1. The flotation system 5 may be attached to the liner 200, and/or may be at least partially covered by the liner 200, as shown in FIG. 5-7. The flotation system 5 may further be attached to the structural frame 15.

The flotation system 5 along the rim 4 or walls 3 of the floating lake 1 can comprise different flotation materials and equipment, such as polyurethane systems; polystyrene systems, such as extruded polystyrene and expanded bead polystyrene; polyethylene systems; air filled systems, such as air chambers, rubber air bags, or vinyl air bags; and systems constructed of other suitable materials such as plastics, foams, rubbers, vinyl, resins, concrete, aluminum, and different types of woods, among others. Examples of commercially available flotation materials are Royalex® (a composite material comprising an outer layer of vinyl and hard acrylonitrile butadiene styrene plastic (ABS) and an inner layer of ABS foam, Styrofoam, and high-performance, extruded, closed-cell polyethylene foams, such as Ethafoam™.

The size and type of flotation elements can be determined based on the volume of the floating lake 1, and the amount of water disposed in the floating lake 1, and the buoyancy desired to be provided by the flotation elements. For example, the floatation system 5 can be sized to provide enough buoyancy to the floating lake 1 so that the floating lake 1 remains floating (i.e., not coming into contact with the bottom of the surrounding water body) even with high internal pressures. Alternatively, the floatation system 5 and the depth of the floating lake 1 may be designed such that at least some portion of the bottom of the floating lake 1 comes into contact with the bottom of the surrounding water body.

In an embodiment, additional features can be added to the floating lake 1. For example, the rim 4 of the floating lake 1 can be constructed to comprise beaches, walkways, pedestrian promenades, pontoons, handrails, sloped entry systems, and/or several other amenities. Additional features may also be optionally attached either to the outside perimeter or the inside perimeter of the floating lake 1, such as floating docks, which can be modular or fixed arrangements, floating platforms, pontoons, and others.

The floating lake 1 may be anchored or fixed in place within the surrounding body of water. For example, the floating lake 1 may be anchored to the bottom of the surrounding body of water, and/or may be fixed or attached to the shore of the surrounding body of water. The floating lake 1 may comprise multiple anchor points 210 from which the floating lake may be tethered by tethers 220 to corresponding anchor points or anchors on the bottom or along the shore of the surrounding water, shown in FIG. 3. The number and location of the anchor points 210 can be configured based on the size of the floating lake 1, and the size and conditions (e.g., typical weather conditions, tides, and currents) of the surrounding water. The anchor points 210 may be reinforced and may comprise any suitable materials, e.g., plastic, metal, concrete, and combinations thereof. According to an embodiment, tethers 220 connecting the floating lake 1 to the anchors may be adjustable and/or extendable. This will allow for increased flexibility depending upon need. For example, if increased currents or waves are observed in the surrounding water body, the length of the tether can be increased (or decreased), manually or automatically, to prevent the resulting forces from stressing the material of the floating lake.

Figure 9A:
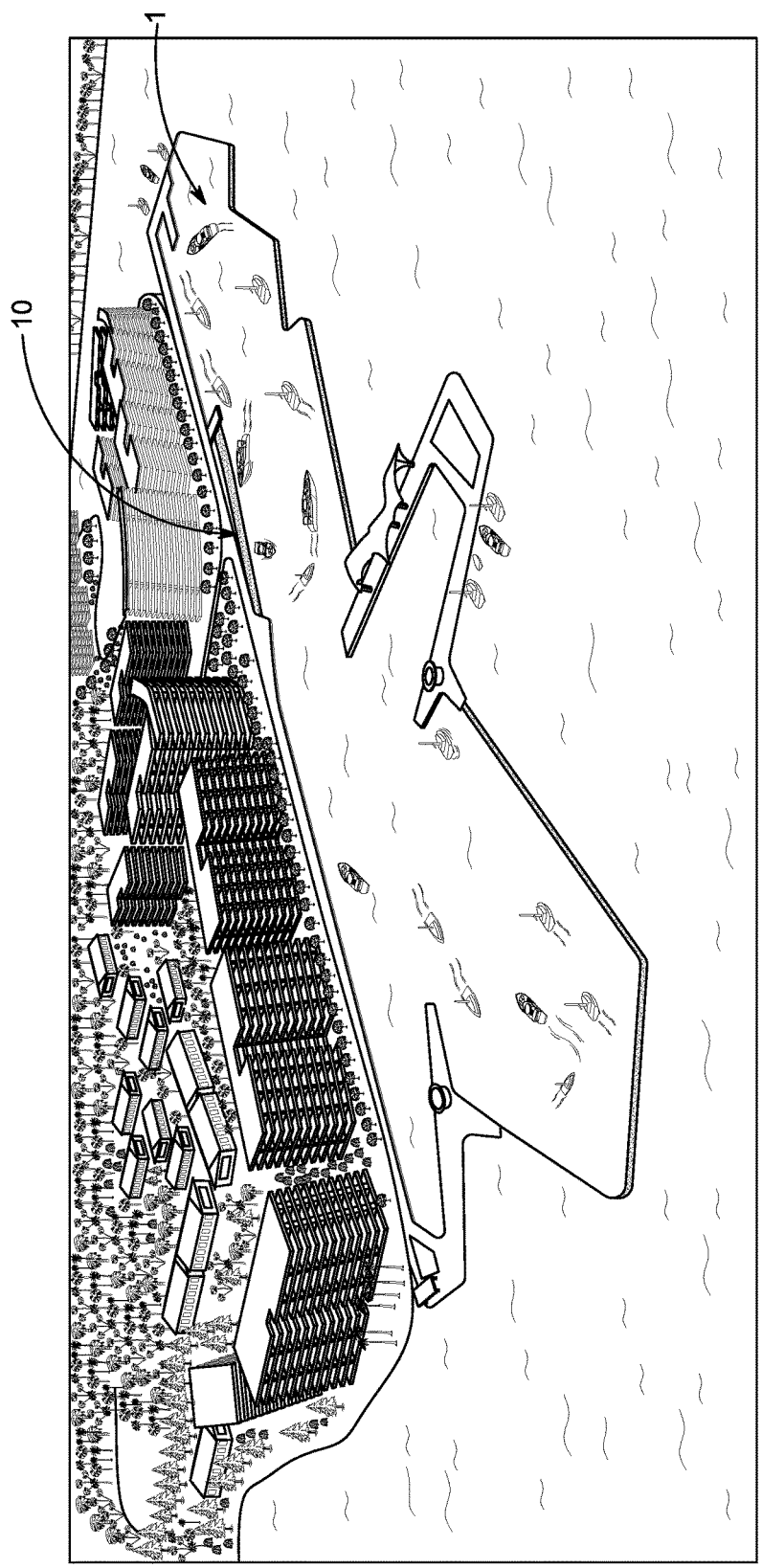
FIGS. 9A and 9B shows embodiments of the floating lake of FIG. 1.
Figure 9B:
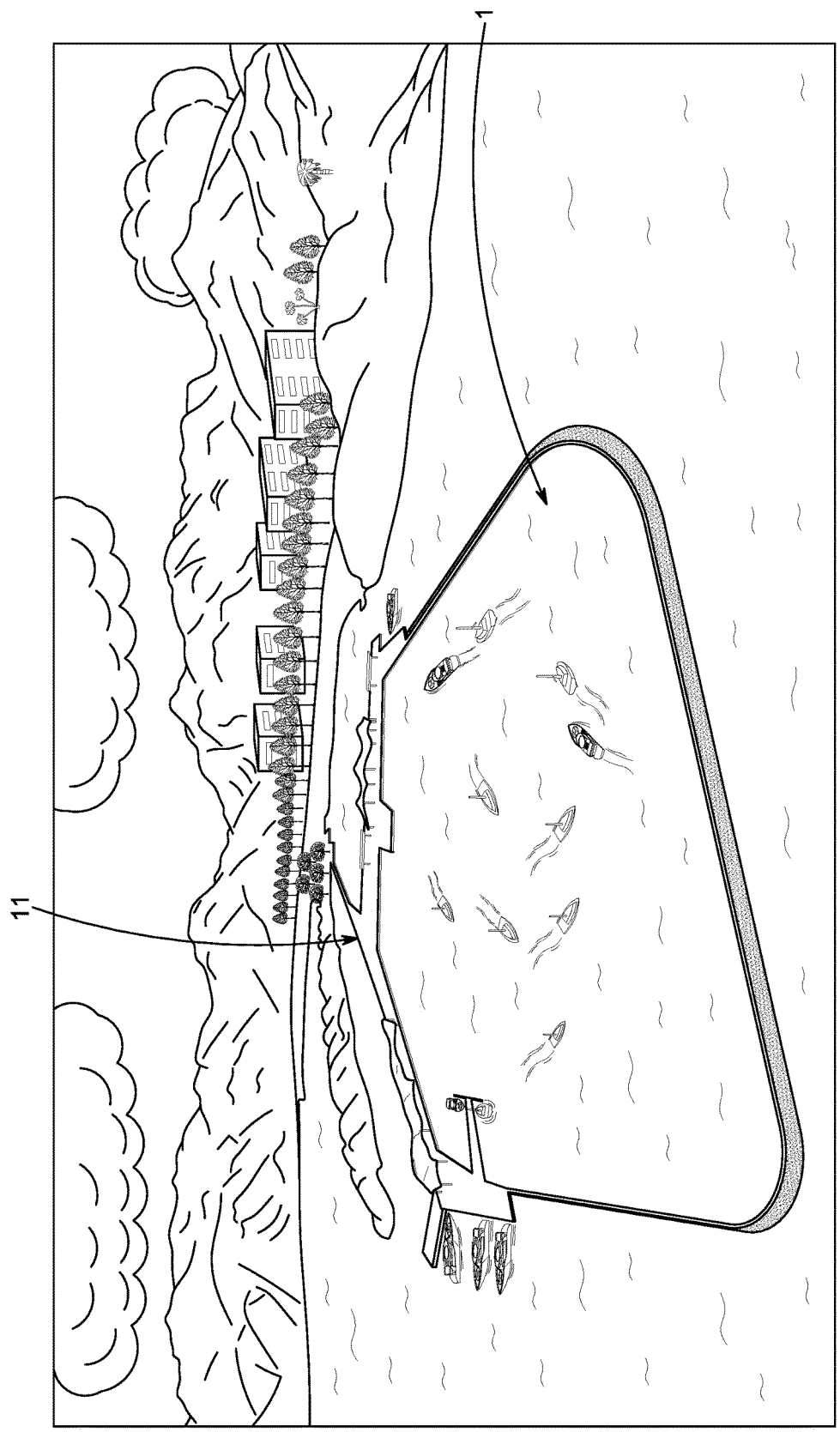

In an embodiment, the floating lake 1 is designed and configured to be attached to mainland along a section of the rim 4 of the floating lake 1. As can be seen in FIG. 9A, the floating lake 1 can be anchored to mainland directly or by a deck system 10 that provides a suitable and safe entry of persons from mainland to the floating lake system. In another embodiment, as shown in FIG. 9B, the floating lake 1 is separated from mainland and is located off the shore of the surrounding water body. The floating lake 1 can be connected to mainland by a deck/bridge system 11 that allows safe and suitable entry of persons from mainland to the floating lake system. In another embodiment, the floating lake system is not connected to mainland and can be accessed through the natural or artificial surrounding water body.

According to an embodiment, a positive pressure is provided in the floating lake 1. Positive pressure inside the floating lake can be used to ensure that the water contained in the floating lake 1 will not be contaminated by the surrounding water in case of a puncture or damage to the bottom 2 or walls 3, and to help maintain the shape of the floating lake 1. Positive pressure inside the lake will allow the water from inside the floating lake 1 to exit into the surrounding water body, and therefore the water within the floating lake 1 would not be contaminated. In order to maintain the positive pressure in case of damage to the bottom 2 or walls 3 of the floating lake 1, water can be added into the floating lake 1 at a rate that maintains a positive pressure within the floating lake 1.

According to an embodiment, positive pressure can be maintained within the floating lake 1 by maintaining the surface 6 of the water in the floating lake 1 above the water level 100 of the surrounding body of water, i.e., by slightly overfilling the floating lake 1. Without such overfilling, the floating lake 1 will assume its normal shape and volume. However, as the floating lake's 1 walls 3 and bottom 2 are constructed from flexible materials, the materials will bend due to the weight of the water when the floating lake 1 is overfilled. Bending of the materials will cause the actual level of water in the floating lake 1 to become similar or equal to the level of the surrounding water, while still maintaining the desired positive pressure.

Although in practice the water level will approximately equalize with the level of the surrounding water, the theoretical increase in water level can be used to calculate the needed additional volume of water to create the desired positive pressure. For example, if the level of the water within the floating lake is desired to be 2 mm above the water level of the surrounding water, the above-water-level volume can be calculated by multiplying the water surface times the height of the above-water-level. In practice, however, due to the flexibility of the walls 3 of the floating lake 1, i.e., the structure separating the volume of the floating lake from the surrounding water, when the above-level volume is added, the walls 3 of the floating lake 1 expand, and the actual level of water in the floating lake becomes similar or equal to the level of the surrounding water.

In a preferred embodiment, the positive pressure should be at least about 20 Newtons per square meter ($N/m^2$) on the floating lake's inner surface to prevent water from the surrounding water from entering the floating lake 1 in case of puncture or other damage. In other embodiments, the positive pressure is at least about 10 $N/m^2$, about 15 $N/m^2$, about 18 $N/m^2$, about 25 $N/m^2$, or about 30 $N/m^2$. A positive pressure of at least 20 $N/m^2$ is equivalent to maintaining the surface 6 of the water in the floating lake 1 at least about 2 mm above the surface 100 of the surrounding water, generating a water volume that is above the surrounding water level. As discussed, the increase in the water level is theoretical and in reality the walls 3 and bottom 2 of the floating lake 1 flex to accommodate the extra water volume, and the water level of the floating lake 1 and surrounding water body become about equal. Therefore, such positive pressure may also be based on the extra water volume that exceeds the initial water volume of the floating lake 1 in its natural (non-flexed) state.

Positive pressure can be maintained in the floating lake 1 by pumping water into the lake as required to maintain the desired pressure by means of a pumping system. For example, positive pressure can be maintained by pumping water for a period of time that is not less than 50% of the time within a 7-day period. Preferably, positive pressure is continuously maintained in the floating lake. The higher inner pressure in the floating lake 1 is counterbalanced by the buoyancy provided by the floatation system 5. According to an embodiment, the size of the floatation system 5 and the buoyancy provided by the floating materials is configured to correspond to the load exerted by the positive pressure caused by the extra water volume and by users and equipment that are on the floating lake 1 or its perimeter. The size and shape of the floatation system 5 can be adjusted (by adding or removing buoyant material) in order to change its buoyancy to account for the resulting loads.

According to an embodiment, the floating lake 1 may comprise a coordination system, where the coordination system can receive information about water quality and physicochemical parameters, process the information, and activate processes to maintain the water quality parameters and other physicochemical parameters within preset limits. The floating lake may comprise a coordination system for maintaining the quality of the water and other physicochemical parameters in the floating lake within predetermined ranges. The coordination system allows activating the operation of different processes, which can be done automatically with a coordination assembly and control units receiving information, or manually by entering and/or processing the information manually.

In optional embodiments, the coordination system includes a number of sensors disposed in and about the floating lake. The information from the sensors can be input, either manually or automatically, into a computer which processes the information. The coordination means can simply provide instructions to be carried out by a person, or can direct the correct action automatically.

According to an exemplary embodiment shown in FIG. 5, the coordination system comprises a coordination assembly 20 capable of obtaining and/or receiving information (from, e.g. sensors disposed in and about the floating lake 1 and surrounding water), processing the information and activating processes (either by providing instructions or by activating such processes automatically) based on the received information. The coordination assembly 20 may include a control unit 22, such as a computer, and at least one monitoring device 24, such as a sensor. The sensor may be an oxidation-reduction potential ("ORP") meter, a turbidity meter, or other apparatus for measuring a water quality parameter. According to other embodiments, the coordination assembly 20 may include two or more monitoring devices 24. The coordination assembly 20 may also comprise additional monitoring devices 24 for other water quality parameters, such as pH, alkalinity, hardness (Calcium), chlorine, and microbial growth, among others.

According to alternative embodiments, the coordination system may be replaced by one or more persons to manually obtain and/or enter and/or process information, or activate and/or perform processes for maintaining water quality parameters and/or other physicochemical parameters. The processes may comprise the addition of water treatment chemicals and/or operation of a mobile suctioning device, among others.

According to an embodiment, the coordination system may comprise an automated system. The automated system may be programmed to monitor water quality parameters and/or physicochemical parameters continuously or at preset time intervals, and activating one or more systems. For example, the automated system may activate addition of chemicals for treating the water upon detecting a crossing of a predetermined value. According to an alternative embodiment, the coordination system comprises manually controlling the addition of treatment chemicals based on an empirical or visual determination of water quality parameters.

The floating lake 1 may comprise a system for adding treatment chemicals to the water. According to the embodiment shown in FIG. 5, the system for adding treatment chemicals comprises a chemical application system 30. The chemical application system 30 may be automated and may be controlled by the control unit 22 of the coordination assembly 20.

According to an alternative embodiment shown in FIG. 6, the chemical application system 30 may be operated or activated manually based on water quality parameters. For example, the water quality parameters can be obtained manually, by empirical or analytical methods, such as algorithms, based on experience, visual inspection, or by using a sensor, and the information about the water quality parameters can be processed manually or by entering into a processing device (e.g., a computer). Based on the information about the water quality parameters, operation of the chemical application system 30 may be activated manually, e.g., by activating a switch.

The chemical application system 30 can be operated on site or through a remote connection (e.g., via the internet), where the information is sent to a central processing unit and can be accessed through the remote connection, allowing activating the operation of the chemical application system 30.

The chemical application system 30 may comprise at least one chemical reservoir, a pump for dosing chemicals, and a dispensing apparatus. The chemical application system 30 may comprise multiple chemical reservoirs to house separate treatment chemicals, such as oxidants, flocculants, and others. The pump may be actuated by a signal from the control unit 22 or manually by activating a switch either on site or remotely. The dispensing apparatus may comprise any suitable dispensing mechanism, such as an injector, a sprinkler, a dispenser, piping, or combinations thereof.

FIG. 7 shows an alternative embodiment where chemicals may be dosed manually into the water or by using a separate chemical application mechanism. For example, water quality parameters can be obtained manually, visually, or by using a sensor, and the information about the water quality parameters can be processed manually or by entering into a processing device (e.g., a computer). Based on the information about the water quality parameters, chemicals can be manually added into the water.

The bottom 2 of the floating lake 1 may be cleaned using a mobile suctioning device 42 that is capable of moving along the bottom 2 of the floating lake 1 to remove settled particles from the bottom 2. The bottom 2 of the floating lake 1 may be cleaned intermittently to provide an attractive coloration to the water body and avoid accumulation of settled material and debris found on the bottom 2. Typically, the mobile suctioning 42 device is able to clean a flexible bottom 2 with a Young's modulus of up to 20 GPa.

The floating lake 1 typically also includes a filtration system 40. According to an embodiment, the filtration of only a portion of the water in the floating lake is sufficient to maintain the water quality within the desired water quality and physicochemical parameters. As seen in FIGS. 5-7, the filtration system 40 includes at least one mobile suctioning device 42 and an associated filtration system 44. The mobile suctioning device 42 is configured to suction a portion of water from the bottom 2 of the floating lake 1 that contains debris, particulates, solids, floccules, flocculated materials, and/or other impurities that have settled on the bottom 2. Suctioning and filtering this portion of the water volume in the floating lake provides the desired water quality without a filtration system that filters the entire water volume of the floating lake, which is in contrast to conventional swimming pool filtration technologies that require filtering the entire water volume 1 to 6 times per day.

According to an embodiment, the mobile suctioning device 42 is able to move along the bottom 2 of the floating lake 1. However, to maximize the efficiency of removal of debris, particulates, solids, floccules, flocculated materials, and/or other impurities that have settled on the bottom 2, the mobile suctioning device 42 can be configured such that its movement creates minimal dispersion of the settled materials. In embodiments, the mobile suctioning device 42 is configured to not include parts, such as rotating brushes that could function to re-disperse a substantial portion of the settled materials from the bottom 2 of the floating lake 1 during operation of the suctioning device.

The activation of the operation of the mobile suctioning device 42 may be controlled by a coordination system including a control unit 22 or manually by an operator. According to an embodiment shown in FIG. 5, activating the operation of the mobile suctioning device 42 is controlled by the control unit 22. FIGS. 6 and 7 show alternative embodiments where the mobile suctioning device 42 is activated manually, e.g., by activating a switch or sending an activation message.

The mobile suctioning device 42 may comprise a pump, or a separate pump or pumping station may be provided to suction the water and to pump the suctioned water to the filtration system 44. The separate pump or pumping station may be located within the floating lake 1, along the perimeter of the floating lake 1, or outside of the floating lake 1, e.g., on the shore of the surrounding body of water.

The mobile suctioning device 42 is in fluid communication with the filtration system 44. The filtration system 44 generally includes one or more filters, such as a cartridge filter, sand filter, micro-filter, ultra-filter, nano-filter, or a combination thereof. The mobile suctioning device 42 is typically connected to the filtration system 44 by a collecting line 43 comprising a flexible hose, rigid hose, a pipe, among others. The filtration system 44 can be located along the perimeter of the floating lake 1, in a floating facility, or along the coastline of the surrounding water body. The capacity of the filtration system 44 is generally scaled to the capacity of the mobile suctioning device 42. The filtration system 44 filters the water flow from the mobile suctioning device, corresponding to a small portion of the volume of water in the floating lake. Filtered water from the filtration system 44 is returned to the floating lake by a return line 60 comprising a flexible hose, rigid hose, a pipe, an open channel, among others. The location of the returning water may be optimized to minimize costs of pumping the water.

Compared to a conventional filtration system with capacity to filter the entire body of water in the pool 1 to 6 times per day, the filtration system 44 of the present application can be configured to have a filtration capacity that is about $1/10$ of the conventional system, or about $1/30$ of the conventional system, or about $1/60$ of the conventional system, or about $1/100$ of the conventional system, or about $1/300$ of the conventional system. This translates to daily filtration capacity that is in the range of about 1:10, or about 1:25, about 1:50, about 1:75, about 1:100, about 1:200, or about 1:300 of the floating lake's volume. The energy consumption of the filtration system is roughly proportional to size and, thus, significant costs savings can be expected with lower energy consumption, and requiring smaller equipment for the filtration process.

Figure 8:
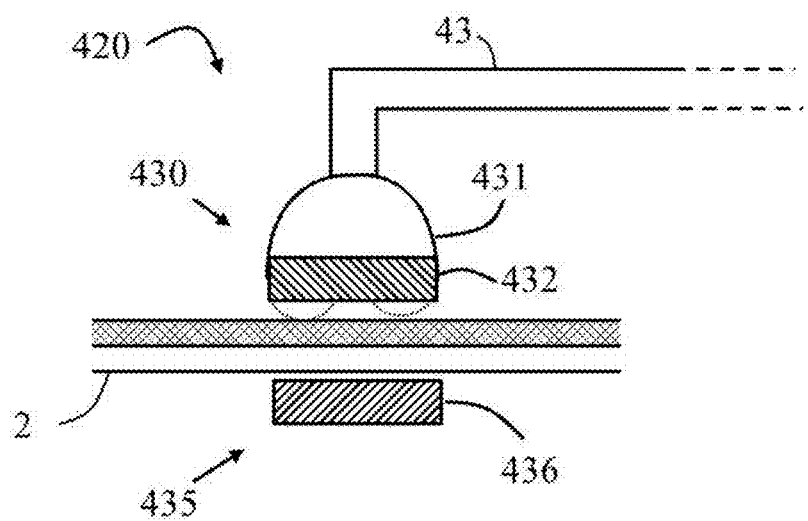
FIG. 8 is a schematic illustration of an embodiment of a suctioning device according to an embodiment of the present invention.

In an embodiment, the mobile suctioning device 42 can comprise a magnetic system adapted to clean flexible bottoms under water. An improved cleaning of a floating lake with a flexible bottom can be achieved with a mobile suctioning device that is capable of adhering to the bottom material with opposing magnetic components. As shown in FIG. 8, the mobile magnetic suctioning device 420 having a magnetic system comprises an inner component 430 and an outer component 435. The inner component 430 is placed on the bottom 2 of the floating lake 1 on the inside of the floating lake 1, in contact with the water of the floating lake 1. The inner component 430 may include at least a suctioning apparatus 431. The outer component 435 is placed on the outside of the floating lake 1 in contact with the surrounding water.

The magnetic system may comprise two or more magnetic components (432, 436) capable of attracting one another. The magnetic components 432, 436 may either have opposing magnetic fields, or at least one of the magnetic components has a magnetic field and one or more magnetic components are ferromagnetic (i.e., attracted by the magnetic field). The inner component 430 of the mobile suctioning device 420, which includes the suctioning apparatus 431, comprises a first magnetic component 432. The inner component 430 with the first magnetic component 432 is placed along the inner surface of the bottom 2 of the floating lake 1. The outer component 435 comprises a second magnetic component 436 that is placed on the outer surface of the bottom 2 and is in contact with the surrounding water. The first and second magnetic components 432, 436 are aligned at corresponding locations along the bottom 2 of the floating lake 1 so that the magnetic attraction maintains the alignment of the first and second magnetic components 432, 436. The magnetic system is thus capable of maintaining the mobile suctioning device 420 along the flexible bottom 2 of the floating lake 1. The inner and outer components 430, 435 of the mobile suctioning device 420 can comprise brushes, rollers, tracks, treads, or other mechanisms for propelling the mobile magnetic suctioning device 420 along the bottom 2.

In one embodiment, the inner component 430 is propelled along the bottom 2 of the floating lake 1, and due to the interactions between the first and second magnetic components 432, 436, the outer component 435 is pulled along so that it remains adjacent to the inner component 430. In an alternative embodiment, instead of the inner component 430 pulling the outer component 435, the outer component 435 is propelled along the outside surface of the bottom 2 and pulls the inner component 430 and the suctioning apparatus 431 along with it. This can be accomplished by, e.g., providing the outer surface of the bottom 2 with a propelling system that may comprise tracks, treads or another configuration allowing the outer component 435 to crawl along the outer surface of the bottom 2. Providing a propelling system along the outer surface of the bottom 2 allows for a more inexpensive and lighter inner component 430.

In another embodiment, the mobile suctioning device 42 comprises a flexible mobile suction means that moves through the bottom of the floating lake, where the floating lake 1 provides a stable bottom for the mobile suctioning device to move through. The flexible mobile suction means can adapt to the stable bottom, which is flexible, in order to thoroughly clean it.

Figure 11A:
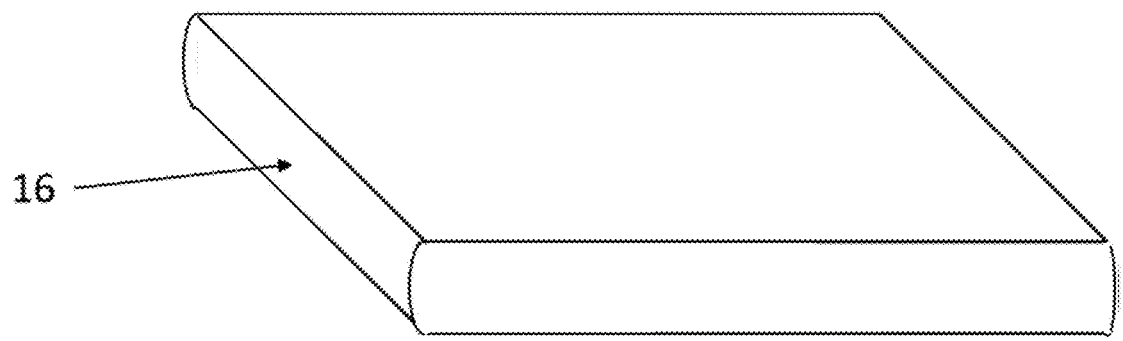
FIGS. 11A and 11B are schematic illustrations of an inflatable section for the floating lake of FIG. 1.
Figure 11B:
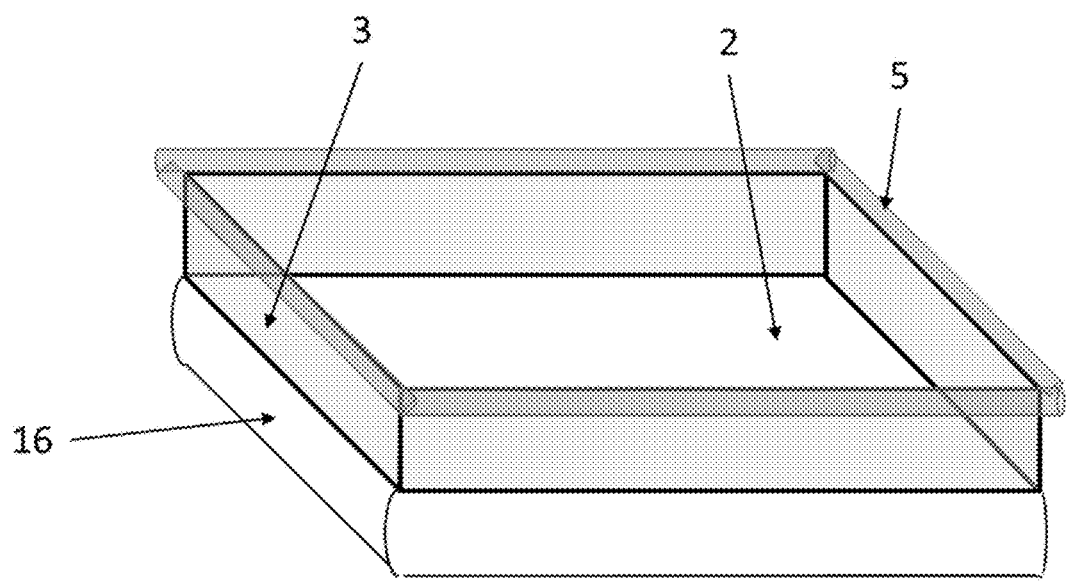

In a still further embodiment, the bottom 2 of the floating lake 1 comprises a layered structure. As can be seen in FIGS. 11A and 11B, in an exemplary embodiment, the layered structure comprises a layered material such as cushion-type material filled with air, water, or another liquid captured between the layers, functioning as an extra cushion 16 with water or air between the water inside the floating lake and the surrounding water. This cushion 16 can provide the bottom 2 with stability and allowing, for example, more efficient operation of the suctioning apparatus. The cushion can also be filled with expandable foam materials.

Figure 12A:
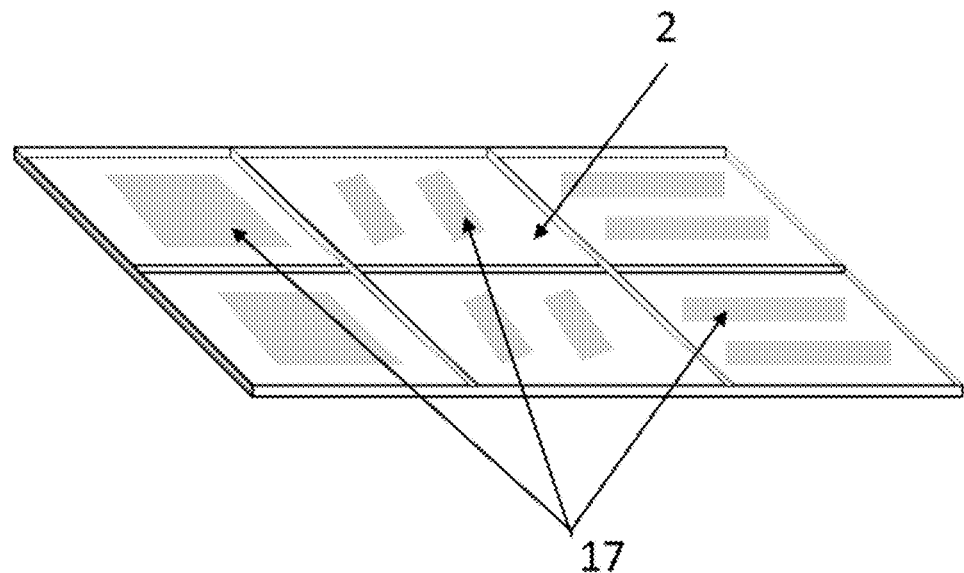
FIG. 12A is a schematic illustration of different dispositions of inflatable sections within the bottom of the floating lake of FIG. 1.
Figure 12B:
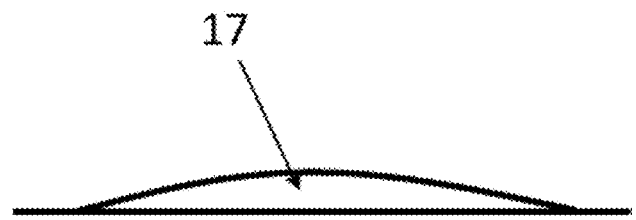
FIGS. 12B and 12C are schematic illustrations of a partial cross section of the inflatable sections of FIG. 12A.
Figure 12C:
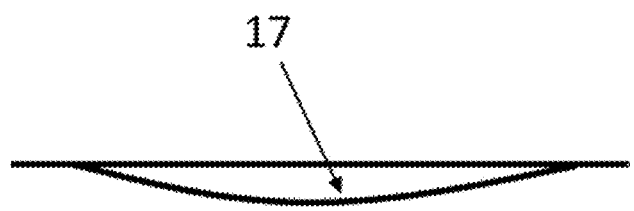

In another embodiment, the liner comprises a series of inflatable sections 17 in the liner, distributed along the bottom 2 of the floating lake 1. As shown in FIG. 12A, the inflatable sections 17 are attached to the bottom and can be inflated so that the inflatable section 17 expands upwards (FIG. 12B) or downwards (FIG. 12C) from the bottom 2, depending on the configuration and fabrication of the inflatable sections 17. It is recommended that the inflatable sections 17 are configured on the outer side of the bottom (as shown in FIG. 12C), on the surrounding water body's side, in order to avoid affecting the plain bottom of the floating lake.

The inflatable sections 17 can take on a variety of forms. In one embodiment, the sections are substantially rectangular, covering the entire surface area of the liner 200 and separating it into separate sections. In other embodiments, however, the inflatable sections 17 have other shapes, e.g., triangular or pentagonal, as necessary in order to effectively support the operation of the suctioning device 42 and counteract external forces. The inflatable sections 17 may also take the form of tubes, forming the perimeter of the various shapes, thereby reducing the surface area that needs to be inflated. Inflation of the sections can be accomplished in any usual manner, for example, by providing the liner 200 with integrated inflation conduits, connected to one or more pumps, either permanently or as needed. Although in most embodiments, the inflatable sections 17 are inflated with air, more purified gases or other fluids can be used, such as water or fluids having a density less than that of the surrounding water. Also, some of the inflatable sections 17 of a plurality of inflatable sections 17 can be filled with one liquid or gas, while others are filled with another liquid or gas, or the inflatable sections 17 can be filled with a mixture of liquid and gas (e.g., water and air), to achieve different buoyancies within the sections.

These inflatable sections 17 can be permanently inflated during installation or be selectively inflated when needed. For example, the inflatable section 17 can be permanently or selectively inflated to cause the bottom to become stable enough to support the weight and movement of the suctioning device 42. Other uses of the selectively inflatable sections can be when certain forces are expected, e.g., increased wind or waves—caused by storms or large ships.

The liner with the inflatable sections 17 may also be incorporated into a larger structure. The larger structure may be a thicker liner 200, where the inflatable sections 17 comprise an additional layer of the liner 200. The other layers may or may not have their own inflatable sections 17. If the other layer(s) has/have inflatable sections 17, such sections may be aligned with the respective additional inflatable sections 17. Also, the bottom liner 202 may be attached to rigid structures (e.g., structural frames 15), to allow providing tension to the bottom material and attaching anchoring systems.

The floating lake 1 may also include a skimming system 50. The skimming system 50 can be used to separate floating debris and oils and greases from the water. As shown in FIGS. 5-7, the skimming system 50 may include a skimmer 52 that skims the surface water of the floating lake 1, in fluid communication with a separation system 54. The skimmer 52 is generally connected to the separation system 54 by a connecting line 53 comprising a flexible hose, rigid hose, a pipe, an open channel, among others. Because of the different nature and quality of impurities (e.g., oil, grease and floating debris) in skimmed water as compared to impurities in the bottom 2 of the floating lake 1, the skimmed water usually does not need to be filtered. Therefore, according to an embodiment, the separation system 54 may comprise a degreaser (e.g., an over flow apparatus) for separating oils and greases from the water and a screen or coarse filter for separating debris. Water from the separation system 54 can be returned to the floating lake 1 through the return line 60. The return line 60 may be the same, or may be separate from the return line from the filtration system 40. According to an embodiment, the skimming system 50 includes multiple skimmers 52 that may be spread out along the perimeter of the floating lake 1. FIG. 5 shows one skimmer 52 and a second skimmer 52 shown in phantom to represent a plurality of skimmers. The operation of the skimming system 50 is preferably continuous, or may alternatively be intermittent. The operation of the skimming system 50 may be controlled by the control unit 22 (FIG. 5) or manually (FIG. 6).

Operation of Floating Lakes

Currently, floating swimming pools are very uncommon, and the floating pools found in the market are small in size and are operated as conventional swimming pools. Conventional floating swimming pools are typically built and operated according to swimming pool standards, which require high and permanent levels of chemicals and the filtration of the complete body of water from 1 to 6 times per day. Application of conventional swimming pool technology to the floating lakes of the present invention would give rise to two main problems: (1) high cost of applying swimming pool technology to large bodies of water due to the use of high rates of chemicals and the filtering of the complete water volume from 1 to 6 times per day with a conventional centralized filtration system; and (2) a possible hazard that could occur in case of damage to the bottom or walls of the floating lake. Different technology and a method of maintenance must be used for maintaining sanitation standards in large floating lakes because in using conventional swimming pool technology, water with high chemical content could potentially be released into the surrounding water body, adversely affecting the aquatic life and marine or fresh water environment. Therefore, the use of conventional swimming pool technology should be avoided in order to conserve energy and to protect the ecosystem of the surrounding water body.

According to an embodiment, water quality and physicochemical conditions are maintained in the floating lake 1 by processes comprising adding treatment chemicals and removing debris, particulates, solids, floccules, flocculated materials, and/or other impurities from the bottom of the floating lake according to water quality parameters and/or physicochemical conditions. Water quality in the floating lake 1 may be obtained, for example, for specific parameters such as oxidation-reduction potential ("ORP"), turbidity, pH, alkalinity, hardness (Calcium), chlorine, microbial growth, among others. The chemical application system can be timely activated by the coordination system to maintain the water quality parameters within set limits. The systems can be activated based on an actual need, resulting in the application of smaller amounts of chemicals and using less energy than in conventional swimming pool water treatment methods.

In embodiments, water quality parameters can be obtained manually, for example by visual inspection, by using a water quality meter (e.g., a probe such as a pH probe, a turbidity meter, a colorimeter, or an ORP meter), or by obtaining a sample and measuring water quality using an analytical method. Information about the water quality parameters can be obtained by or entered into the coordination system. In an embodiment, an automated coordination system may be programmed to monitor water quality parameters continuously or at pre-set time intervals, to compare the results to a predetermined parameter and to activate one or more systems when the parameter has been crossed. For example, the automated system may activate addition of treatment chemicals or operation of a filtration system upon detecting a crossing of a predetermined parameter. In an alternative embodiment, water quality parameters may be obtained manually and the information entered into the coordination system, or the results may be compared to a predetermined value and addition of treatment chemicals may be activated manually. Treatment chemicals used to maintain water quality in the floating lake may comprise any suitable water quality treatment chemicals. For example, the treatment chemicals may comprise oxidants, flocculants, coagulants, algaecides, sterilizing agents, or pH regulating agents. According to a preferred embodiment, the treatment chemicals comprise an oxidant and a flocculant.

Water quality parameters may be obtained according to the requirements of the floating lake, continuously or at certain time intervals. In an embodiment, the ORP (or another water quality parameter) of the water is determined either by a monitoring device 24 (system of FIG. 5), such as a sensor, or by empirical or analytical methods, such as algorithms based on experience, or visual inspection (systems of FIGS. 6 and 7).

The ORP of the water in the floating lake is maintained at a minimum ORP for a minimum period of time within 52-hour cycles to provide water having the desired water quality. An oxidant is applied to the water in the floating lake to maintain an ORP above a minimum value for a minimum period of time within a 52-hour cycle (e.g., the treatment cycle). In embodiments, the ORP level is maintained at about 550 mV or higher. Such minimum ORP level is much lower than the ORP level typically maintained in swimming pools to achieve sufficient disinfection. The ORP treatment time within the 52-hour cycle can be continuous, periodic, intermittent, or discontinuous. In embodiments, the minimum period of time is about 10 to about 20 hours within 52 hour cycles. Although it is possible to maintain the minimum ORP level continuously, i.e., 24 hours/day, the ORP level may also be maintained only during specific periods, e.g., the minimum periods, double the minimum period, or spaced apart by 4, 6, 8, 10 or 12 hour intervals during which the ORP level is not maintained. The oxidant may be selected from halogen-based compounds, permanganate salts, peroxides, ozone, sodium persulfate, potassium persulfate, an oxidant produced by an electrolytic method, or combinations thereof. The amount of oxidant added to the water (the "effective amount") can be predetermined or can be determined (e.g., by the control device 22 in FIG. 5 or manually) based on the measured ORP and the desired increase in ORP of the water.

Turbidity of the water may also be monitored to maintain water quality in the floating lake 1. Flocculants and/or coagulants can be added to aggregate, agglomerate, coalesce, and/or coagulate suspended solids, organic matter, inorganic matter, bacteria, algae, and the like into particles which than settle to the bottom of the floating lake. For example, flocculants can be added to the water in order to induce the flocculation of suspended solids that cause turbidity, such as organic and inorganic matter, and therefore aid in the process of settling such particles where they can be removed by the mobile suctioning device. Generally, the flocculant or coagulant is applied or dispersed into the water by the chemical application system. Suitable flocculants or coagulants include, but are not limited to, synthetic polymers such as quaternary ammonium-containing polymers and polycationic polymers (e.g., polyquaternium), cationic and anionic polymers, aluminum salts, aluminum chlorhydrate, alum, aluminum sulfate, calcium oxide, calcium hydroxide, ferrous sulphate, ferric chloride, polyacrylamide, sodium aluminate, sodium silicate, chitosan, gelatin, guar gum, alginate, moringa seeds, starch derivatives, or other components with flocculant properties, and combinations thereof.

In an embodiment, addition of flocculants is activated before the turbidity of the water exceeds a predetermined value, such as 2 NTU (Nephelometric Turbidity Units), 3 NTU, 4 NTU, or 5 NTU. The coordination system may be used to activate the addition of flocculants and/or coagulants before turbidity of the water exceeds the predetermined value in order to cause the flocculation and settling of organic and inorganic matter. The fraction of water in which the floccules collect or settle is generally the layer of water along the bottom 2 of the floating lake 1. The floccules settle at the bottom 2 of the floating lake 1 and can then be removed by the mobile suctioning device 42 without requiring that all of the water in the floating lake 1 be filtered, e.g., only a small fraction is filtered. The "small fraction" of water being filtered can be less than about 30%, less than about 25%, less than about 20%, less than about 15%, less than about 10%, less than about, 9%, less than about 8%, less than about 7%, less than about 6%, less than about 5%, less than about 4%, less than about 3%, less than about 2%, less than about 1%, less than about 0.9%, less than about 0.8%, less than about 0.7%, less than about 0.6%, or less than about 0.5% per day of the total volume of water of the floating lake. The amount of flocculant added to the water can be predetermined or can be determined (e.g., by the control device 22 in FIG. 5 or manually) based on the turbidity and the desired reduction in turbidity of the water. The water treatment chemical may preferably also have algaecidal properties.

Dosing of the water treatment chemicals, such as oxidants and flocculants, can be done bearing in mind possible contamination and hazards to the surrounding water body in case of damage to the bottom or walls of the floating structure, or in case water contained within the floating lake is transferred into the surrounding water body for any other reason.

The settling of particulates, solids, floccules, flocculated materials, and/or other impurities to the bottom 2 of the floating lake 1 may cause a change in the appearance of color of the bottom 2 of the floating lake 1. For example, the settled impurities can make the color of the bottom 2 appear darker than the original color. According to the method, the color of the bottom 2 of the floating lake 1 is monitored, and when the color has changed by a predetermined amount, the suctioning of water and impurities from the bottom 2 of the floating lake 1 is activated. The measured or perceived color, which can be obtained by empirical or analytical methods, such as algorithms based on experience, visual inspection, automated equipment, or others, can be compared to a predetermined value, such as an increase in a color component (e.g., black) from the actual color of the bottom 2.

It will be appreciated by those skilled in the art that in the context of the color of the bottom 2, the term "bottom" refers to the surface of the top-most layer of the bottom 2 that is visible from above the bottom 2.

In an exemplary embodiment, the color of the bottom 2 of the floating lake 1 can be monitored for changes in the black component on a CMYK or other suitable color scale. The CMYK color scale uses four colors expressed in percentages: cyan, magenta, yellow and black. The K component of the CMYK scale is the black component of the color. For example, a color with CMYK 15%, 0%, 25%, and 36% represents a color with 15% cyan, 0% magenta, 25% yellow, and 36% of black component. The black component of the bottom of the lake can be assessed by visually comparing the bottom color of the lake with standard CMYK charts or color palettes, and determining the black component according to the percentage found in the CMYK chart. Alternatively other color components may also be used.

Alternative color scales, such as L*a*b* (also known as Lab or CIELAB), X-Y-Z, RGB, or HEX, can also be used. In the L*a*b* scale, color is measured on three axis: L, a, and b, where the L-axis measures lightness. An L-value of 100 indicates white and L=0 indicates black. When impurities settle on the bottom 2 of the floating lake 1 and the perceived color of the bottom 2 reaches L=30, the operation of the mobile suctioning device 42 is activated.

According to an embodiment, the color of the bottom 2 of the floating lake 1 is monitored using a monitoring device 24, such as a colorimeter. According to an alternative embodiment, the color of the bottom 2 of the floating lake 1 can be determined by visual inspection by comparing the color of the bottom 2 of the floating lake 1 to a color palette. The color of the bottom 2 of the floating lake 1 can be visualized from the surface of the water, or, in particular when turbidity is high (e.g., more than about 7 NTU), by using a transparent peephole attached to a tube that allows visualization of the bottom 2 of the floating lake 1.

The bottom 2 of the floating lake 1 may ordinarily have a color that lends a pleasing color and appearance to the water in the floating lake 1. For example, the bottom 2 of the floating lake 1 may have a colored material or may be painted a color such as white, yellow or blue. In an exemplary embodiment, the color of the bottom 2 of the floating lake 1 is measured by a monitoring device 24 (e.g., a colorimeter) of the coordination assembly 20. The perceived color of the bottom 2 of the floating lake 1 can be compared to its actual or original color by empirical or analytical methods, such as algorithms based on experience, visual inspection, comparison with color guides, colorimeters, spectrophotometers, and others.

The operation of the mobile suctioning device 42 can be activated through the coordination system. In an embodiment shown in FIG. 5, the operation of the mobile suctioning device 42 can be activated by the control unit 22. In other embodiments shown in FIGS. 6 and 7, the operation of the mobile suctioning device 42 can be activated manually.

According to an embodiment, the operation of the mobile suctioning device 42 is activated before the color of the bottom 2 of the floating lake 1 exceeds a predetermined value (e.g., before the bottom's color black component exceeds 30% on a CMYK scale (or other suitable color scale)). In an embodiment, the operation of the mobile suctioning device 42 is activated by the control unit 22 of the coordination assembly 20.

The color of the bottom 2 of the floating lake 1 can be further monitored to determine an end point of the operation of the mobile suctioning device 42. For example, if the black component of the color of the bottom 2 of the floating lake 1 decreases below the predetermined value, the operation of the mobile suctioning device 42 may be ceased. Such value may be, for example, where the black component is 10%-units above the value of the black component of the actual color of the bottom 2, or 5 units above, or 3 units above. For example, if the original color of the bottom 2 on the CMYK scale is 15%, 0%, 25%, 10%, (the black component being 10%), the value can be set at 20% black, 15% black, or 13% black. The value may be predetermined based on the actual color of the bottom 2 of the floating lake 1 and the desired level of cleanliness of the floating lake 1.

The color of a large floating lake may be monitored at multiple locations throughout the lake. If the floating lake also includes multiple suctioning devices 42, the bottom 2 can selectively be cleaned in areas to avoid the color of the bottom 2 from exceeding a predetermined value.

The suctioning device 42 is preferably a mobile suctioning device that is capable of cleaning a flexible bottom 2 with a Young's modulus of up to 20 GPa. The mobile suctioning device 42 moves through the flexible bottom 2 of the floating lake 1, suctioning any settled material along with water. The suctioned water and impurities are then sent into a filtration system 44 that separates the impurities from the water. The water suctioned by the suctioning device 42 can be sent to the system 44 by use of a pump or a pumping station.

After suctioning and filtration, the filtered water can be returned into the floating lake. The point of return of filtered water into the floating lake should be designed in order to minimize energy costs of pumping such water flow.

Surface debris and oils can be removed from the floating lake by the use of the skimming system 50. The skimming system 50 can comprise floating skimmers or can be installed along the perimeter of the floating lake 1.

Water should be supplied to the floating lake 1 in order to compensate for evaporation, for the water that is lost from the floating lake for cleaning purposes, and for the eventual leakage rate. Evaporation rates are dependent on the meteorological conditions of the location of the floating lake.

According to an embodiment, water is supplied to the floating lake 1 at a rate that is sufficient to maintain a positive pressure and to replace water lost due to cleaning, leakage and evaporation according to the following equation:

$$\text{Replacement rate} \geq \text{Evaporation rate} + \text{Cleaning rate} + \text{Leakage rate}$$

The replacement rate includes water due to leakage, including losses caused by damage to the walls 3 or bottom 2 of the floating lake 1. The cleaning rate corresponds to the rate of water that is lost within the filtration process of the suctioned water. It must be noted that although the filtration system is a closed system, since the water suctioned by the mobile suctioning device 42 that cleans the flexible bottom 2 is sent to a filtration system 44 and then returned into the floating lake 1, such cycle may comprise water loss due to the backwash process of the filtration system, or if some water is left at the filtration media along with impurities, among others. Therefore, the cleaning rate corresponds to the effective water loss due to backwash processes of the filtration system or other losses, such as small losses within the piping network and other systems and equipment.

Such rates are generally measured in water volume that is supplied to the floating lake per unit of time.

The floating lake 1 can be fed with replacement water from the surrounding water body. The replacement water from the surrounding water body can be analyzed in order to determine if it can be fed directly into the floating lake 1, or if it needs to be treated prior to being fed to the floating lake 1. For example, the replacement water can be analyzed using the Platinum-Cobalt color standard to asses if the water can be fed directly into the floating lake 1. The Platinum-Cobalt scale assigns to the color a standard number in the range of 1 to 500$^+$. The Platinum-Cobalt test consists of comparing a 100 mL specimen (previously filtered if there is any visible turbidity) with the standard colors that have been prepared according to ASTM requirements. According to an embodiment, the replacement water for the floating lake 1 has a true color lower than 30 Pt—Co. Also, the microbial quality of the replacement water can also be tested prior to feeding into the floating lake 1. In a preferred embodiment, the replacement water contains less than 2,000 CFU/ml (colony forming units per milliliter) in order to feed it directly to the floating lake 1. If the replacement water has a true color higher than 30 Pt—Co, or if the replacement water from the surrounding water body has more than 2,000 CFU/ml of bacteria, the water is typically pre-treated before feeding into the floating lake 1. If the surrounding water body's water has a true color lower than 30 Pt—Co, and less than 2,000 CFU/ml of bacteria, the water may be used directly or pretreated before feeding it to the floating lakes. In other embodiments, water from other sources can also be used as replacement water for the floating lakes.

In another embodiment the floating lake comprises permeable walls. It is possible that the surrounding water has a water quality suitable for recreational purposes, but is not esthetically attractive due to the bottom being covered with sediments, debris, or sludge that provide a dark and unpleasant coloration or feel to the water body. In such case, a floating lake can be provided where the walls are permeable and allow the good quality water to pass through, but the bottom still comprises a solid, flexible material. Providing a solid bottom, i.e., one that is stable and continuous and can withstand the pressures caused by the mobile suctioning device, to the floating lake allows, for providing a pleasing color to the bottom and thus the water, and allows for the suctioning device to move through the bottom, suctioning settled organic and inorganic matter. Therefore, in the case that the conditions of the natural or artificial water body are suitable for recreational purposes, the walls can be built out of permeable materials that allow incorporating water directly from the surrounding water body. In an embodiment, the permeability of the material forming the walls can be selected to provide for a particular permeation rate.

Other embodiments of the floating lake comprise systems for controlling the temperature of the water. For example, the floating lake can be constructed to hold a water temperature that is higher than the temperature of the surrounding water. In cool climates, natural waters may otherwise be of suitable quality for recreational use, but may be too cold for most or all of the year for swimming or water sports. In order to provide for a warmer water temperature in a floating lake 1, the bottom of the lake may be a darker color, such as a dark blue, green, brown, or black. A dark colored bottom allows for solar radiation to heat the water in the floating lake 1 to a temperature above that of the surrounding water.

For example, the temperature in the floating lake 1 may be 4-10° C. warmer than in the surrounding water. The bottom and walls of the floating lake 1 may also be constructed of insulating material, further facilitating retaining heat in the floating lake 1.

The floating lake system of present invention may be used for other purposes, such as for industrial cooling purposes, for example for thermal power plants, datacenters, foundries, residential and industrial HVAC systems, thermo-solar power plants, paper industries, refineries, nuclear plants, among other residential or industrial cooling processes. For example, a floating lake system of the invention can be installed within a large water body in order to provide industrial cooling systems with high quality cooling water at low cost and dissipate heat from heated cooling water without affecting significantly the properties of the large natural or artificial water body that the floating lake is installed within. In an embodiment, the floating lake comprises a surface area from about 50 to about 30,000 m² per MW of cooling required by the industrial process. The water from the floating lake generally contains significantly reduced amounts of organic matter compared to the large natural or artificial water body in which it is installed, thereby providing a heat exchanger in an industrial process with high quality cooling water that minimizes biofouling and prevents undesirable build up in pipes of the heat exchanger that can reduce heat transfer capacity. In an embodiment, the floating lake can be configured to include a feed line operatively connecting the floating lake to a heat exchanger in the industrial process for feeding the heat exchanger with cooling water from the floating lake and a return water line operatively connecting the industrial process to the floating lake for returning heated cooling water from the heat exchanger to the floating lake. The cooling water is treated according to the methods of the invention and recycled in the floating lake to achieve a sustainable cooling system over time.

EXAMPLES

The following example is illustrative, and other embodiments exist and are within the scope of the present invention.

Example 1

A floating lake with a surface area of 8 m×8 m with an average depth of 2.5 m was built in order to test the technology from the present application. The floating lake had non-permeable walls and bottom made from a single layer of 1 mm PVC material, where the bottom presented a Young's modulus of 3 GPa. The PVC material was thermo fused to obtain the floating lake structure, and floating materials were attached to the surface perimeter to provide structural stability and maintain the shape of the floating lake.

The floating lake was installed in an irrigation pond with a surface area of more than 6,000 m² that contained poor quality water esthetically not suitable for recreational purposes. The irrigation pond contained water with high turbidity, a bottom covered with sediments that provided a dark coloration to the water, and a high organic matter concentration. Key parameters of the water quality in the surrounding lake were measured. The total bacterial count was found to be 300 CFU/ml and the true color measured on the Platinum-Cobalt scale was of 35. Therefore, the water from the surrounding water body was pre-treated before feeding it to the floating lake. Although the water complied with the bacteriological requirements, it did not comply with the true color requirements, and therefore was treated prior to feeding it to the floating lake.

The floating lake was designed to have a positive pressure by calculating the extra volume needed to feed the floating lake, which is equivalent to having a water level that is above the water level of the pond. The positive pressure was chosen to be at least 20 N/m². Since the surface of the floating lake was 64 m² the theoretical minimum above-level volume was calculated as 0.128 m³ according to the following equation:

$$\text{Above-level volume } (m^3) \geq 0.002 \text{ m} \times 64 \text{ m}^2$$

$$\text{Above-level volume } (m^3) \geq 0.128 \text{ m}^3$$

Accordingly, as the level of the water within the floating lake is desired to be 2 mm above the water level of the surrounding water, the total volume of water needed to achieve this above-level volume was calculated to be 0.128 m³. In practice, however, it was discovered, due to the flexibility of the walls of the floating lake, i.e., the structure separating the volume of the floating lake from the surrounding water, when the above-level volume was added, the walls of the floating lake expanded. This expansion caused the actual level of water in the floating lake to become equal to the level of the surrounding water, as well as the desired positive pressures.

The designed above-level volume was 0.5 m³, corresponding to a positive pressure equivalent to a water height inside the floating lake of 7.8 mm above the surrounding water level, or a positive pressure of about 76 N/m². Such positive pressure was maintained by providing the borders of the floating lake with flotation devices that compensated for the water weight.

A coordination system activated the application of oxidant agents to maintain an ORP level of 570 mV for 18 hours within 52-hour cycles, and also activated the application of a flocculant composition to avoid the turbidity of the water to exceed 5 NTU. The applied oxidant agent was sodium hypochlorite, added at a concentration of 1 ppm during the application. Adding the flocculant caused the flocculation of impurities that then were allowed to settle on the bottom of the floating lake.

A coordination system also activated the operation of a mobile suctioning device, by sending a signal to the proper operator of the device, and where the mobile suctioning device allowed cleaning the flexible bottom built out of PVC with a Young's modulus of around 3 GPa. The mobile suctioning device was a specially designed and comprised a magnetic system that allowed cleaning the flexible bottom. The suctioning device comprised an inner component that was placed on the inside bottom surface of the floating lake and an outer component placed on the outside bottom surface of the floating lake. The inner and outer components were magnetically attracted and allowed cleaning the flexible bottom of the floating lake by suctioning the settled material.

The suctioning device was activated before the increase in the bottom's color black component exceeded 30% on a CMYK scale as compared to the original color. The bottom's color black component was assessed through visual comparison with a CMYK scale. The suctioning device was operated, and moved through the bottom of the floating lake suctioning the settled impurities.

The water suctioned by the suctioning device was pumped through flexible hoses into a filtration system that was located on the shore of the irrigation pond.

Water was supplied to the floating lake to maintain a positive pressure in the floating lake. The replacement water compensated for the evaporation rate, which was estimated as 2 mm per day, and a very small water flow corresponding to the cleaning rate. Therefore the replacement rate was calculated to maintain a positive above-water volume according to the cleaning rate and evaporation rate. The replacement water flow was intermittent, and allowed maintaining a positive pressure equivalent to maintaining the water level of the floating lake between 5 mm and 1 cm above the surrounding water for more than 50% of the time within 7 day periods.

As a comparison, the following water quality parameters were obtained from the floating lake and the surrounding water body:

TABLE 1

Comparison of Water Quality in Surrounding Water Body and the Floating Lake

| Parameter | Unit | Floating Lake | Surrounding Irrigation Pond |
|---|---|---|---|
| True Color | Pt—Co | 10 | 35 |
| Total Bacteriological Count | CFU/ml | <5 | 300 |
| Turbidity | NTU | 2 | 10 |
| Clarity (Horizontal transparency with Secchi Disc Visualization) | Secchi Disc Measure | More than 20 meters of horizontal transparency | Less than 1 meter of horizontal transparency |

The floating lake and method of the Example provided a safe and esthetically attractive water body that presented better coloration and water quality than the surrounding pond.

While certain embodiments of the invention have been described, other embodiments may exist. While the specification includes a detailed description, the invention's scope is indicated by the following claims. Furthermore, while the specification has been described in language specific to structural features and/or methodological acts, the claims are not limited to the features or acts described above. Rather, the specific features and acts described above are disclosed as illustrative aspects and embodiments of the invention. Various other aspects, embodiments, modifications, and equivalents thereof which, after reading the description herein, may suggest themselves to one of ordinary skill in the art without departing from the spirit of the present invention or the scope of the claimed subject matter.

What is claimed is:

1. A method for treatment of water in a floating lake for recreational purposes, wherein the floating lake is installed within a water body selected from an ocean, river, lake, reservoir, lagoon, pond, canal, estuary, stream, ocean bay, river bay, dam, pond, harbor, and bay, the floating lake having a surface area larger than 5,000 m$^2$ and including walls and a bottom, and wherein the bottom of the floating lake is constructed of a flexible material having a Young's modulus of up to 20 GPa, wherein the method comprises:
   a. applying an oxidant to the water in the floating lake to maintain an ORP level of at least 550 mV for a minimum of about 10 to about 20 hours within a 52-hour cycle;
   b. applying a flocculant to the water in the floating lake before the turbidity of the water in the floating lake exceeds 5 NTU;
   c. activating operation of one or more mobile suctioning devices before a black color component of the bottom of the floating lake exceeds 30% on a CMYK scale, wherein the CMYK scale denotes a Cyan, Magenta, Yellow, and Black color scale, wherein the one or more mobile suctioning devices suctions a portion of the water from the bottom of the floating lake containing settled solids;
   d. filtering the water suctioned by the one or more mobile suctioning devices and returning the filtered water to the floating lake, thereby providing for removal of settled solids from the water in the floating lake without filtering the total volume of water in the floating lake; and
   e. supplying replacement water to the floating lake to maintain a positive pressure against an inner surface of the walls and bottom of the floating lake, wherein the positive pressure is at least 20 Newtons per square meter of a surface area of the floating lake, wherein the replacement water has a true color of up to 35 Pt—Co and less than 2,000 CFU/ml of bacterial count, wherein the positive pressure is maintained for at least 50% of the time within 7-day intervals, and wherein the replacement water is supplied to the floating lake at a replacement rate according to the following equation:

Floating Lake Replacement Rate≥Floating Lake Evaporation Rate+Floating Lake Cleaning Rate+Floating Lake Leakage Rate.

2. The method of claim 1, wherein the bottom and walls of the floating lake are constructed of non-permeable materials that are capable of maintaining a body of water inside the floating lake and essentially separate the water on the inside of the floating lake from the surrounding artificial or natural body of water.

3. The method of claim 1, wherein the bottom of the floating lake comprises systems that provide stability for the operation of a suctioning device, selected from cushion-type systems, structural frames, a plurality of layers, chambers, and combinations thereof.

4. The method of claim 1, wherein the oxidant is selected from the group consisting of an halogen-based compound, a permanganate salt, a peroxide, ozone, sodium persulfate, potassium persulfate, an oxidant produced by an electrolytic method, and combinations thereof.

5. The method of claim 1, wherein the flocculant is selected from the group consisting of a cationic polymer, anionic polymer, aluminum salt, aluminum chlorhydrate, alum, aluminum sulfate, quaternary ammonium-containing polymers, polyquaternium, calcium oxide, calcium hydroxide, ferrous sulphate, ferric chloride, polyacrylamide, sodium aluminate, sodium silicate, chitosan, gelatin, guar gum, alginate, moringa seed, starch derivatives, and combinations thereof.

6. The method of claim 1, wherein the color of the bottom of the floating lake provides a specific coloration to the water in the floating lake.

7. The method of claim 6, where the bottom has a white, yellow, or blue color, or combinations thereof.

8. The method of claim 1, wherein the application of the oxidant is activated by a coordination system.

9. The method of claim 1, wherein the operation of the one or more suctioning devices is activated by a coordination system.

10. The method of claim 1, wherein the one or more mobile suctioning devices are able to clean the flexible bottom of the floating lake.

11. The method of claim 1, wherein the one or more mobile suctioning devices comprise a magnetic system capable of maintaining the mobile suctioning device along the flexible bottom of the floating lake.

12. The method of claim 1, wherein the one or more mobile suctioning devices comprise a flexible device.

13. The method of claim 1, wherein the filtering of step d is carried out by a filtration system located in a floating facility or on land.

14. The method of claim 1, wherein the replacement water is fed into the floating lake through a pumping system.

15. The method of claim 1, wherein the application of the flocculant is activated by a coordination means.

* * * * *